(12) United States Patent
Strahan et al.

(10) Patent No.: US 11,240,751 B2
(45) Date of Patent: Feb. 1, 2022

(54) COMMUNICATION BETWEEN A WHEEL UNIT SENSOR AND A MASTER CONTROLLER

(71) Applicant: SENSATA TECHNOLOGIES, INC., Attleboro, MA (US)

(72) Inventors: Samuel K. Strahan, Ballymena (GB); Jeremy E. Loraine, Corsham (GB)

(73) Assignee: Sensata Technologies, Inc., Attleboro, MA (US)

( * ) Notice: Subject to any disclaimer, the term of this patent is extended or adjusted under 35 U.S.C. 154(b) by 0 days.

(21) Appl. No.: 16/522,017

(22) Filed: Jul. 25, 2019

(65) Prior Publication Data
US 2021/0029634 A1 Jan. 28, 2021

(51) Int. Cl.
*H04W 52/02* (2009.01)
*B60C 23/04* (2006.01)
*G01L 17/00* (2006.01)

(52) U.S. Cl.
CPC ....... *H04W 52/0212* (2013.01); *B60C 23/045* (2013.01); *B60C 23/0461* (2013.01); *H04W 52/0229* (2013.01); *G01L 17/00* (2013.01)

(58) Field of Classification Search
CPC .......... H04W 52/0212; H04W 52/0229; B60C 23/045; B60C 23/0461; B60C 23/0457; B60C 23/0454; B60C 23/0462; B60C 23/0442; G01L 17/00
See application file for complete search history.

(56) References Cited

U.S. PATENT DOCUMENTS

| | | | |
|---|---|---|---|
| 5,600,301 A | 2/1997 | Robinson, III | |
| 5,963,128 A | 10/1999 | McClelland | |
| 8,731,508 B2 | 5/2014 | Karaoguz | |
| 8,953,718 B2 | 2/2015 | Oehler et al. | |
| 9,420,408 B2 | 8/2016 | Liu | |
| 9,649,896 B1 | 5/2017 | Lin | |
| 10,206,231 B1 | 2/2019 | Kandler et al. | |
| 10,220,660 B2 | 3/2019 | McIntyre et al. | |
| 2006/0208865 A1 | 9/2006 | Quach et al. | |
| 2007/0008097 A1 | 1/2007 | Mori et al. | |
| 2007/0200693 A1 | 8/2007 | Costes | |
| 2010/0073157 A1* | 3/2010 | Maehara | B60C 23/0433 340/447 |

(Continued)

OTHER PUBLICATIONS

International Search Report and Written Opinion, PCT/US2020/038930, dated Sep. 28, 2020, 10 pages.

(Continued)

*Primary Examiner* — Yuwen Pan
*Assistant Examiner* — Fatuma G Sherif
(74) *Attorney, Agent, or Firm* — Mark H. Williams

(57) ABSTRACT

According to one embodiment, a method of improved communication between a wheel unit sensor and a master controller is disclosed. In this particular embodiment, the method includes determining, by the wheel unit sensor, whether a receive schedule of the wheel unit sensor indicates that a receive window has started. The method also includes in response to determining that the receive schedule indicates that the receive window has started, turning-on, by the wheel unit sensor, for the duration of the receive window, a wireless receiver of the wheel unit sensor. In this embodiment, the wireless receiver is configured to receive messages from the master controller.

8 Claims, 18 Drawing Sheets

(56) References Cited

U.S. PATENT DOCUMENTS

2016/0039365 A1    2/2016  Vanderwall
2016/0082791 A1*   3/2016  Lin .................... B60C 23/044
                                                         340/447
2019/0001764 A1    1/2019  Wagner et al.

OTHER PUBLICATIONS

Fraunhofer IIS Magazine, *Waking Up*, Fraunhofer Institute for Integrated Circuits IIS, <https://www.iis.fraunhofer.de/en/magazin/2018/rficient.html>, printed Apr. 26, 2019, 9 pages.

* cited by examiner

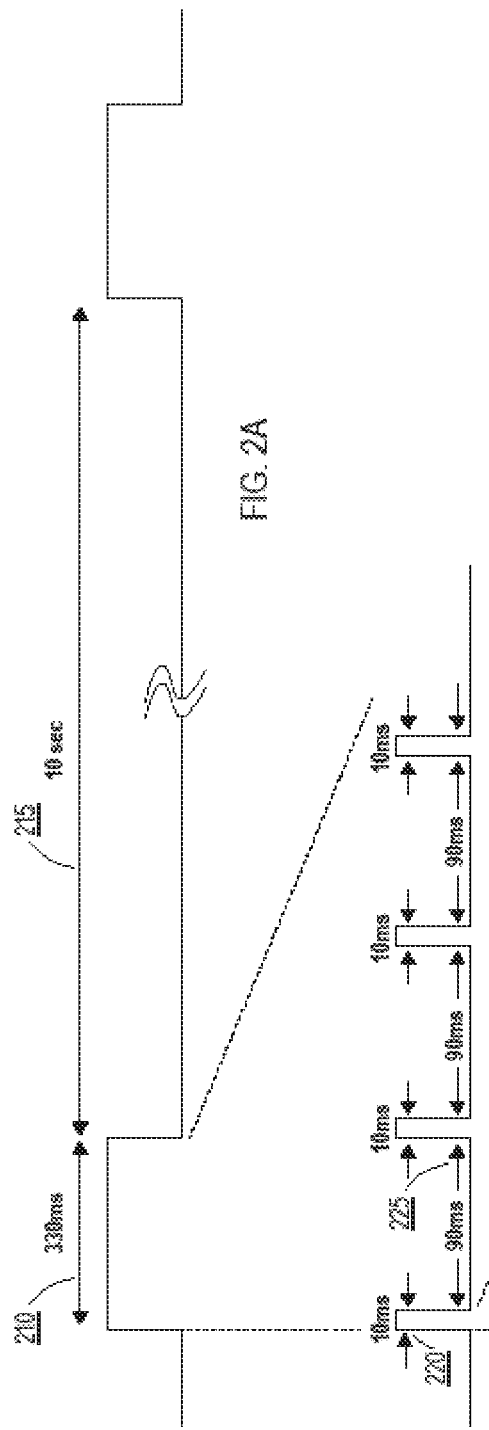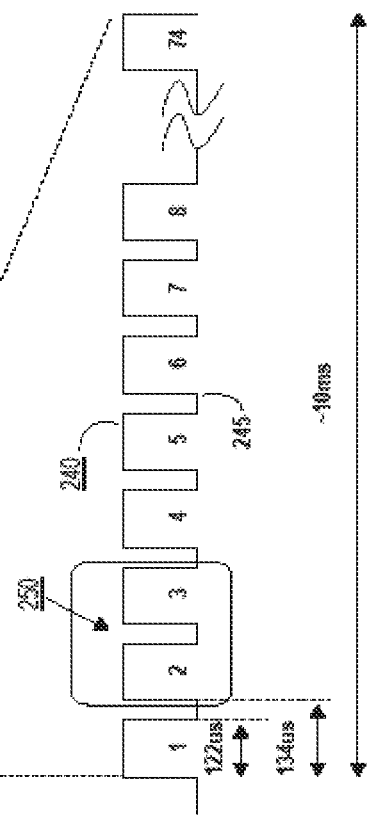

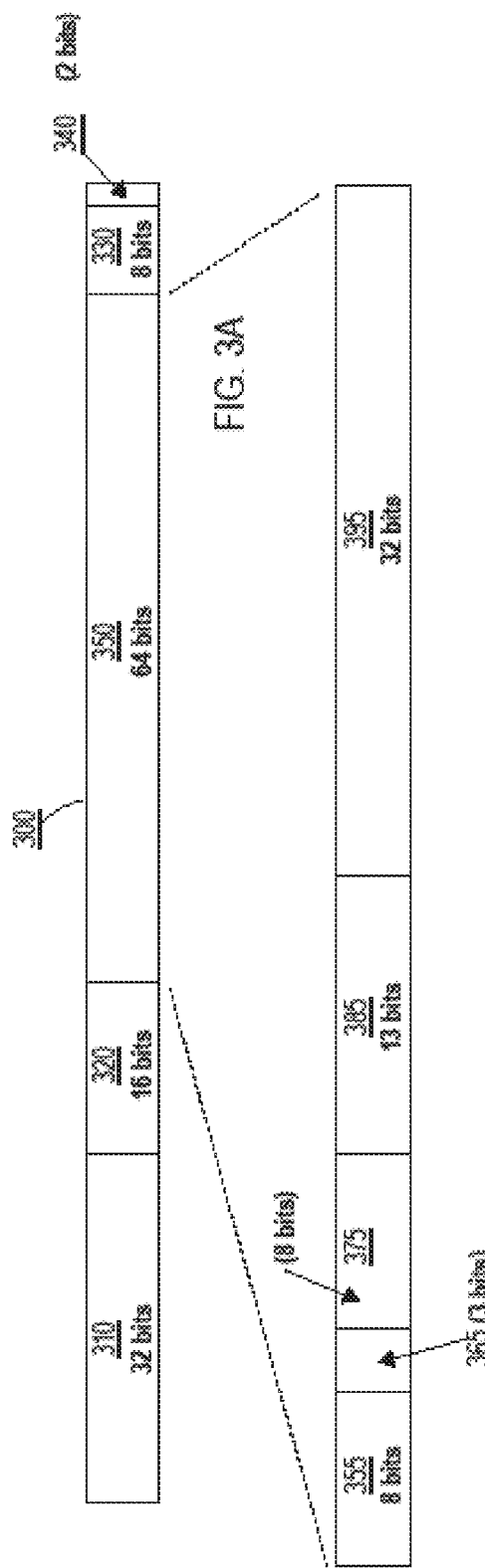

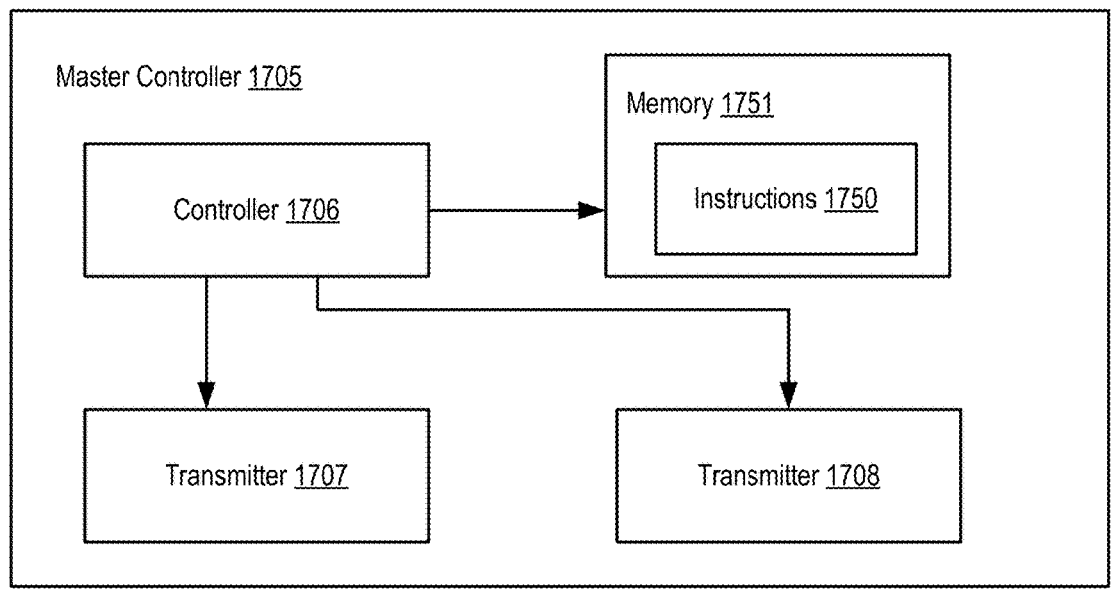
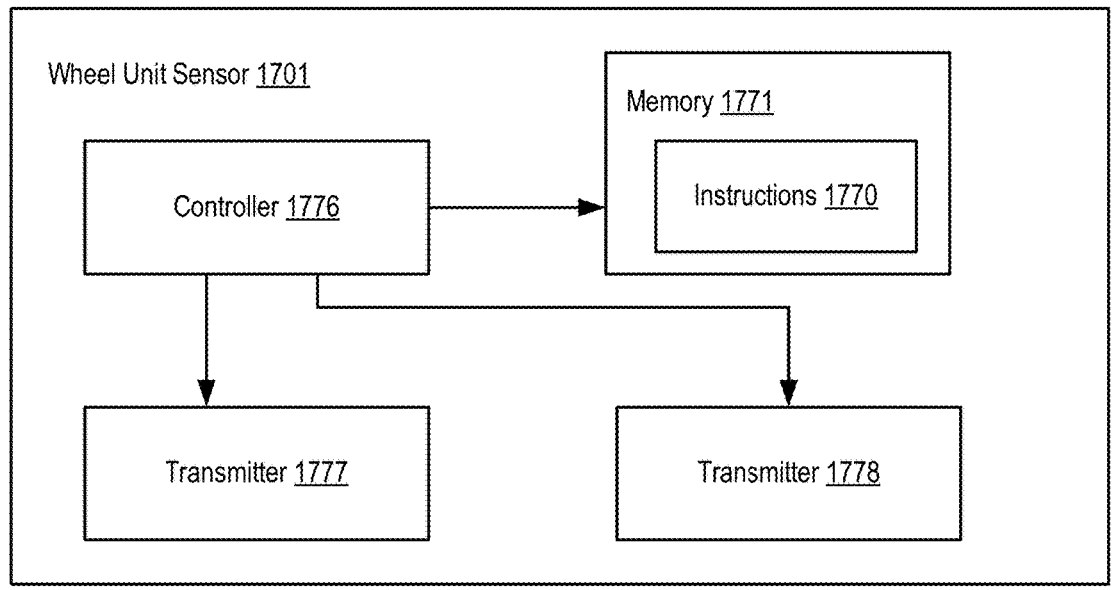
FIG. 17

COMMUNICATION BETWEEN A WHEEL UNIT SENSOR AND A MASTER CONTROLLER

FIELD OF THE INVENTION

The present disclosure relates to electronics. More particularly, this disclosure relates to wheel unit sensors and master controllers.

BACKGROUND OF THE INVENTION

The air pressure of a motor vehicle tire can be an important factor of road safety. Improper tire pressure can lead to greater fuel consumption and inferior vehicle controllability. Tire pressure that is too low can lead to an increase in friction between the road and the tire, negatively affecting vehicle controllability. Low tire pressure can also lead to the tire rolling out of the tire rim, resulting in serious accidents. Tire pressure that is too high can reduce friction between the tire and the road, which can lead to skidding and loss of control. In addition, a high-pressure tire is more prone to burst when its temperature increases during use.

It can be tedious to manually check the tire pressure of each tire of a vehicle before every use of the vehicle. Thus, this type of preventative maintenance was often skipped. This led to the development of tire pressure monitoring systems (TPMS). TPMS are increasingly popular in automotive applications. In fact, a TPMS is required in new cars sold in many different countries, including the United States, the European Union, South Korea, Russia, Indonesia, the Philippines, Israel, Malaysia, and Turkey.

A TPMS is an electronic system that monitors the air pressure inside pneumatic tires. Some TPMS also measure temperature, to provide a more accurate pressure reading. In one approach, an indirect TPMS does not actually monitor air pressure, but instead monitors wheel rotational speed (using sensors such as those being tracked by an anti-lock braking system) because an underinflated tire rotates faster than a properly inflated tire. In another approach, a direct TPMS system utilizes a pressure sensor directly mounted on the wheels or tire of a vehicle. A TPM within the wheel or tire may use wireless radio frequency (RF) technology to transmit the pressure and temperature data to a centralized TPM monitoring location (such as a vehicle's Electronic Control Unit (ECU), to a controller for a remote keyless entry (RKE) system, or to any type of processor used in vehicles). The ECU can supply real-time tire pressure information to the driver of the vehicle through the use of indicator lights or other types of displays.

One of the concerns of the TPM industry is battery life of the wheel and tire mounted monitoring devices. To prolong the life of a wheel or tire mounted TPM device, each TPM device may be completely sealed during manufacture (such as through the use of a suitable potting material or encapsulant). This has the unfortunate side effect of making the battery not user replaceable. Therefore, when the battery of the tire pressure sensor is depleted, the entire tire pressure sensor may need to be replaced. In order to reduce the burden placed on consumers and increase the longevity of these devices, many jurisdictions require that a TPM device be designed to last for a set number of years (e.g., five to ten years). With these restrictions, battery power consumption may be an important design consideration that impacts all aspects of the design of a TPM system including the method and frequency with which TPMS devices communicate.

SUMMARY OF THE INVENTION

In a particular embodiment of the present disclosure, a method is disclosed for improving communication between a wheel unit sensor and a master controller. The method includes a wheel unit sensor determining whether a receive schedule of the wheel unit sensor indicates that a receive window has started. The method also includes in response to determining that the receive schedule indicates that the receive window has started, the wheel unit sensor turning-on, for the duration of the receive window, a wireless receiver of the wheel unit sensor. In this embodiment, the wireless receiver may be configured to receive messages from the master controller during the receive window.

In another embodiment of the present disclosure, a method is disclosed for improving communication between a wheel unit sensor and a master controller. In this particular embodiment, the method comprises the master controller determining whether a transmit schedule of the master controller indicates that a transmit window has started. The method also includes in response to determining that the transmit schedule indicates that the transmit window has started, the master controller transmitting a message to a wireless receiver of the wheel unit sensor.

In both of the above example embodiments, the wheel unit sensor is capable of not only transmitting data, but also receiving messages from a master controller. Because the wheel unit sensor is capable of receiving messages from the master controller, the master controller may be able to provide instructions or commands to the wheel unit sensor. For example, the master controller may transmit a message to the wheel unit sensor indicating that the car is moving, and therefore the master controller wants monitoring data from the wheel unit sensor. In this example, because the master controller is able to control the timing of the transmission of the monitoring data from the wheel unit sensor, the wheel unit sensor may not need motion detection hardware (e.g., an accelerometer) for determining that the vehicle is in operation, and therefore determining that the master controller wants monitoring data. In some embodiments, reducing or eliminating the need for motion detection hardware may reduce power and space consumption and increase the reliability of the wheel unit sensor over a system in which the wheel unit sensor is not capable of receiving messages from the master controller.

This type of two-way communication in a monitoring system, such as a TPM system, may also provide other advantages. For example, in a particular embodiment, the master controller may use a message to request monitoring data from the wheel unit sensor before the vehicle is in motion. This type of pre-motion data may be useful for providing the driver of the car with important information, such as whether a tire is flat, without having to move the vehicle. This type of pre-motion data may not be possible to receive from a wheel unit sensor that only relies on a motion detection device for wakeup.

Furthermore, the present disclosure also provides embodiments that implement two-way communication between the wheel unit sensor and the master controller, while conserving power consumption of the wheel unit sensor. In a particular embodiment of the present disclosure, the wheel unit sensor uses information from the master controller to synchronize the receive window, in which the wireless receiver of the wheel unit sensor is turned-on, with the transmit window, in which the master controller transmits messages. In this example, the wheel unit sensor will know when in a receive schedule that the master controller is expected to transmit messages, which enables the wheel unit sensor to time turning-on the wireless receiver with an expected transmit window of the master controller. Continuing with this example, the wheel unit sensor may conserve power by turning-off power to the wireless receiver during periods of time when the master controller is not expected to transmit messages. As will be explained in greater detail below, conserving power in a wheel unit sensor may enable a wheel unit sensor to comply with battery life requirements.

The foregoing and other objects, features, and other advantages of the present disclosure will be apparent from the following more particular descriptions of exemplary embodiments of the present disclosure as illustrated in the accompanying drawings wherein like reference numbers generally represent like parts of exemplary embodiments of the present disclosure.

BRIEF DESCRIPTION OF THE DRAWINGS

So that those having ordinary skill in the art to which the disclosed technology appertains will more readily understand how to make and use the same, reference may be had to the following drawings.

FIGS. 2A-2C illustrate timing diagrams associated with a receive schedule of a wheel unit sensor configured for improving communication with a master controller, according to at least one embodiment of the present disclosure.

FIGS. 3A-3B illustrates datagrams depicting the layout of data transmitted by a master controller configured for improving communication with a wheel unit sensor, according to at least one embodiment of the present disclosure.

FIG. 17 is a block diagram of a monitoring system for improving communication between a wheel unit sensor and a master controller, according to at least one embodiment of the present disclosure.

DETAILED DESCRIPTION

Figure 1:
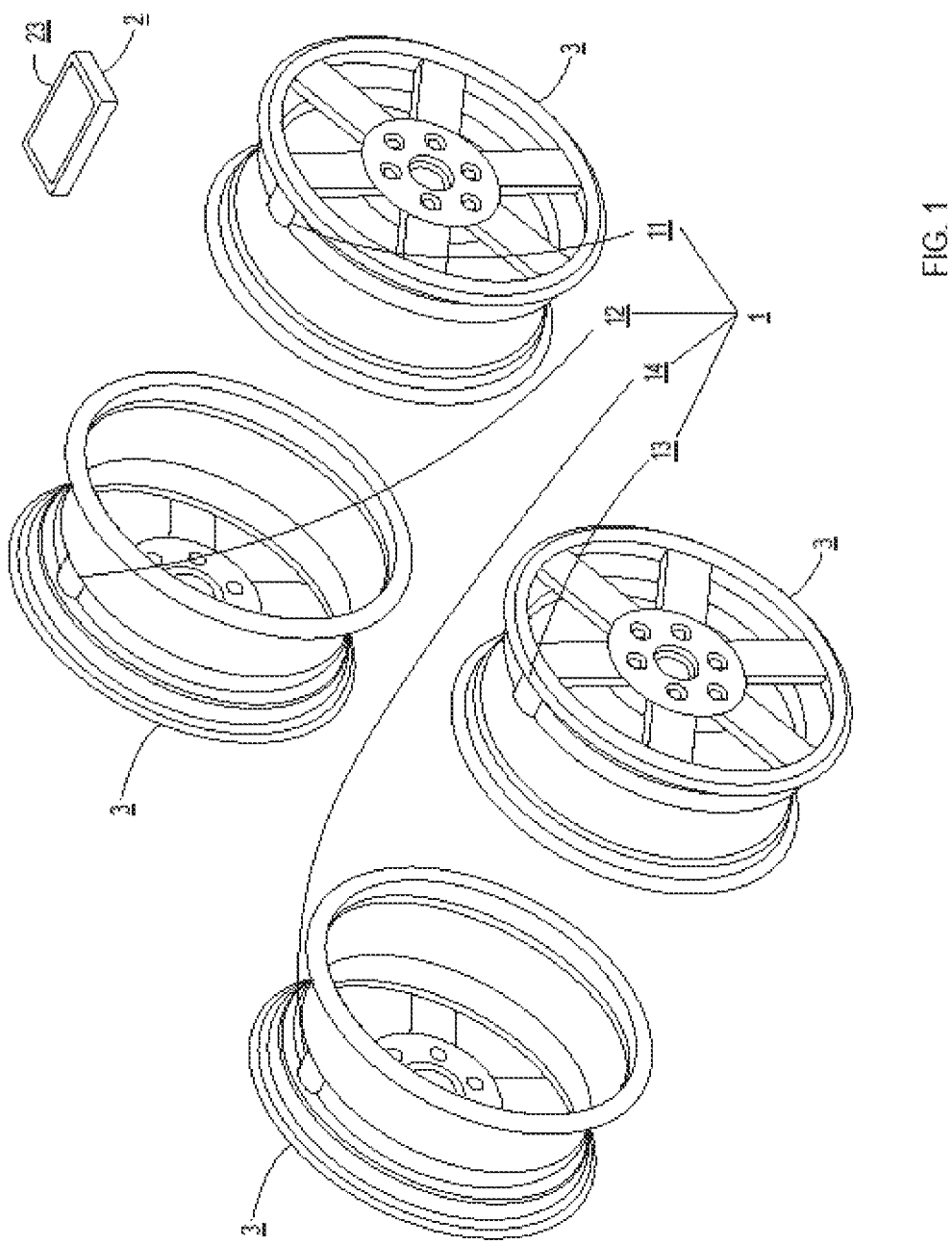
FIG. 1 is an isometric view of an apparatus for improving communication between a wheel unit sensor and a master controller, according to at least one embodiment of the present disclosure.

FIG. 1 is an isometric view of an apparatus for improving communication between a wheel unit sensor (11, 12, 13, 14) and a master controller (2), according to at least one embodiment of the present disclosure. The wheel unit sensors (11, 12, 13, 14) of FIG. 1 are each coupled to wheels (3) via mounting on a wheel or on a valve stem of a tire. In the example of FIG. 1, the wheel unit sensors are configured to collect monitoring data and transmit that monitoring data to the master controller (2). Examples of monitoring data that is collected by the wheel unit sensor include but are not limited to tire pressure information, temperature, tread depth, tire wear, vibrations/impulses, and sound. In a particular embodiment, the wheel unit sensor is a tire pressure monitoring (TPM) sensor.

According to the present disclosure, the master controller (2) may be a central processing unit (CPU), an electronic control unit (ECU), a system on a chip (SOC), an application specific integrated circuit (ASIC), and the like. Both the wheel unit sensors (11, 12, 13, 14) and the master controller (2) may further include supporting circuits, such as volatile memory, non-volatile memory, power, and the like. Data from the master controller (2) can be used to place data on the dashboard or other display (23) of a vehicle through the use of indicator lamps, alphanumeric displays, and the like. While the display (23) is illustrated as being co-located with the master controller (2), it should be understood that display (23) may be remotely located from the master controller (2).

In the example of FIG. 1, the wheel unit sensors (11, 12, 13, 14) of FIG. 1 may also be configured to receive data from the master controller (2). In a particular embodiment, the wheel unit sensors and the master controller utilize Bluetooth Low Energy (also known as "Bluetooth LE" or "BLE") frequencies and technologies to transmit and receive data from each other. Because Bluetooth frequencies are commonly used in other vehicular applications, there is a reduced need for a transceiver dedicated to TPMS usage. For example, in one embodiment, the master controller is an ECU that is configured to transmit and receive BLE signals. In addition, by using BLE technology, it is possible for other BLE enabled systems on a vehicle to receive or request monitoring data (e.g., TPM data) from the wheel unit sensor. For example, the master controller may be any BLE enabled system on the vehicle. It should be understood that although certain embodiments are described in reference to BLE, embodiments are not so limited and can be used at any transmission frequency using any type of protocol. It also should be understood that while embodiments are described with respect to tire pressure sensors, embodiments can be used in any type of use case.

An issue with BLE is that the power usage of BLE transmitters and receivers can be too high for optimum battery usage. Because many BLE devices (such as health or fitness monitors) are charged on a regular basis, battery life is not as critical as it is in a TPMS setting. One way that the wheel unit sensor can reduce the power consumption of a wireless receiver, such as a BLE receiver, is to only turn it on at specific times.

In the example of FIG. 1, the wheel unit sensor is configured to turn-on its wireless receiver during a receive window of a receive schedule and at times outside the receive window, keep the wireless receiver turned-off or idle. In order to limit the time that the wireless receiver is turned-on, wheel unit sensor may be configured to determine whether a receive schedule of the wheel unit sensor indicates that a receive window has started. A receive schedule may be a timing sequence that is used to determine when the wheel unit sensor performs certain actions, such as turn on or off a wireless receiver of the wheel unit sensor. A receive window may be scheduled to appear at specific periods within the receive schedule. For example, a receive window may occur within the receive schedule every ten seconds.

The receive schedule may be associated with a clock cycle of the wheel unit sensor. For example, the receive schedule may indicate that the receive window occurs after a set number of clock cycles. The length of the receive window may also be associated with the clock cycle. For example, the receive window may be a set number of clock cycles. In a particular embodiment, the length of the receive window may be dependent upon the size of the packet that is expected to be received from the master controller. In a particular embodiment, the amount of time that the wireless receiver is turned-on may be minimized by selected the smallest receive window that is possible for receiving a message from the master controller.

In the example of FIG. 1, the wheel unit sensor is further configured to in response to determining that the receive schedule indicates that the receive window has started, turn-on, for the duration of the receive window, the wireless receiver of the wheel unit sensor. In a particular embodiment, the receive window is synchronized with the expected transmission schedule of the master controller. In this example, the wheel unit sensor will know when in a receive schedule that the master controller is expected to transmit messages, which enables the wheel unit sensor to time turning-on the wireless receiver with an expected transmit window of the master controller. If the receive window of the wheel unit sensor is synchronized with the transmit window of the master controller, the wheel unit sensor may receive messages when the wireless receiver is turned-on.

Continuing with this example, the wheel unit sensor may conserve power by turning-off power to the wireless receiver during periods of time when the master controller is not expected to transmit messages. Conserving power in a wheel unit sensor may enable a wheel unit sensor to achieve a battery life requirement.

FIGS. 2A-2C illustrate timing diagrams associated with a receive schedule of a wheel unit sensor configured for improving communication with a master controller, according to at least one embodiment of the present disclosure. FIGS. 2A-2C are presented in descending order of time scale, with FIG. 2A showing the largest amount of time and FIGS. 2B and 2C showing smaller amounts of time.

FIG. 2A shows an exemplary timing diagram of a receive schedule for a wheel unit sensor of one or more embodiments. In this timing scheme, there is a 330 millisecond (ms) interval (210) followed by a 10 second interval (215). This represents the fact that the wireless receiver of the wheel unit sensor is on for 330 ms during interval (210) followed by a 10 second idle period of interval (215). It should be understood that while a 10 second idle period is illustrated; any amount of idle period can be used. An advantage of a 10 second idle period is that a user of a vehicle can determine the tire pressure (or any other monitoring data) of the vehicle within 10 seconds of turning on the vehicle. While any idle period can be used, there are guidelines to consider when choosing an idle period. A shorter idle period can result in greater battery usage, resulting in a shorter life of the wheel unit sensor. On the other hand, a longer idle period results in a longer period of time with no knowledge of the current reading of the wheel unit sensors. A longer idle period also can make it more difficult for the wheel unit sensor and the master controller to remain synchronized with each other.

FIG. 2B illustrates a timing diagram of an exemplary interval 210 in further detail. During each 330 ms interval (210), there are sub intervals that each include a 10 ms receive sub-interval (220) and a 90 ms sub-interval (225) during which the wireless receiver is waiting. During receive interval (220), the wireless receiver is configured to receive messages from the master controller.

FIG. 2C illustrates a diagram of an exemplary receive sub-interval (220) in further detail. FIG. 2C shows that each of the sub-intervals (220) comprises multiple opportunities to receive data from the master controller. In the embodiment shown in FIG. 2C, there are 74 different sub-sub-intervals comprising a 122 microsecond (µs) interval (240) followed by a 12 µs sub-sub-interval (245). It should be understood that a different number of intervals can be used in other embodiments.

During each of the intervals (240), the wheel unit sensor has an opportunity to receive data from the master controller. In a particular embodiment, the wheel unit sensor will receive data in the middle of its receive window (250). For example, between the 35$^{th}$ and 40$^{th}$ interval might be a desirable interval to receive data. As illustrated in FIG. 2C, the receive window (250) is approximately the length of 2 intervals (240) plus an interval (245), or approximately 256 µs in the embodiment shown above.

FIGS. 3A-3B illustrates datagrams depicting the layout of data transmitted by a master controller configured for improving communication with a wheel unit sensor, according to at least one embodiment of the present disclosure. With reference to FIG. 3A, a datagram 300 is illustrated that could be used with one or more embodiments. A datagram is a basic transfer unit of information being transmitted in one or more embodiments. Datagram (300) illustrates the transmission of an exemplary 64-bit word to the wheel unit sensors. Datagram (300) includes a 32-bit preamble (310) followed by a 16-bit sync word (320). Thereafter the 64-bit word (350) is transmitted. In the example of FIG. 3A, the 64-bit word is followed by an error-detecting code (330) and one or more stop bits (340) may end the message. The stop bits (340) may serve to signal the end of the transmission and prepare the receiving party to receiver further information.

Any type of error-detecting code may be used. In some embodiments, a cyclic redundancy check (CRC) may be used for error-detecting purposes. In other embodiments, other error-detecting codes may be used. In a particular embodiment, an error detection procedure could be utilized that includes receiving a plurality of datagrams and conducting a plausibility check on the data. Readers of skill in the art will realize that plausibility checking procedures of sensor signals may be a key element to identifying and locating faults in a vehicle sensor system and ensuring the fault tolerance and integrity of the vehicle sensor system. For example, plausibility checks may include implementing adequate error handling measures, based on the severity of any detected faults and the importance of the data associated with the fault.

With reference to FIG. 3B, the layout of an exemplary 64-bit word (350) is presented in further detail. An 8-bit status field (355) is followed by a burst counter (365) and a message counter (375). Following is a 13-bit field (385) that is unallocated in some embodiments but could be used for other purposes in other embodiments. Field (395) is a 32-bit field that can be used to contain one of a variety of different information, such as identifier information.

In the example of FIG. 3B, burst counter (365) may be a counter that increments for each receive interval (220). In some embodiments, 2-bits are used to count the four separate receive intervals (220). In other embodiments, 3-bits may be used, to allow for expansion to other use cases (such as vehicles with more than four TPMS transmitters).

Message counter (375) may be a counter that increments with each interval (240). As described above, in some embodiments, there may be 74 different intervals in which to transmit or receive data. The message counter may be configured to increment once for each different interval. The size of the message counter field can be selected such that it is large enough to account for the number of intervals in many different embodiments. Thus, while a 7-bit field provides enough bits for embodiments that have 128 intervals, an 8-bit field may be used in some embodiments to provide extra headroom in case a greater number of intervals is desired.

Burst counter (365) and message counter (375) may be used to provide synchronization between the plurality (1) of wheel unit sensors (11, 12, 13, 14) and the master controller (2) of FIG. 1. For example, a message from the master controller may include values indicating the burst counter and the message counter when the master controller transmitted the message. In this example, the wheel unit sensor may use the burst counter value and the message counter value of the message it receives during the receive window to determine when in the transmit schedule of the master controller, the particular message was transmitted. In a particular embodiment, the wheel unit sensor may want to synchronize its receive window with the middle of the transmit window of the master controller. By placing the receive window in the middle of the transmit window (which may be significantly larger than the receive window), if the clock cycles of the wheel unit sensor or the master controller drift in either direction relative to each other, the receive window may still remain in the transmit window and allow the wheel unit sensor to receive the next message. In this example, the wheel unit sensor may use the burst counter value and the message counter value to adjust the receive window to place it in the middle of the next transmit window.

Figure 4:
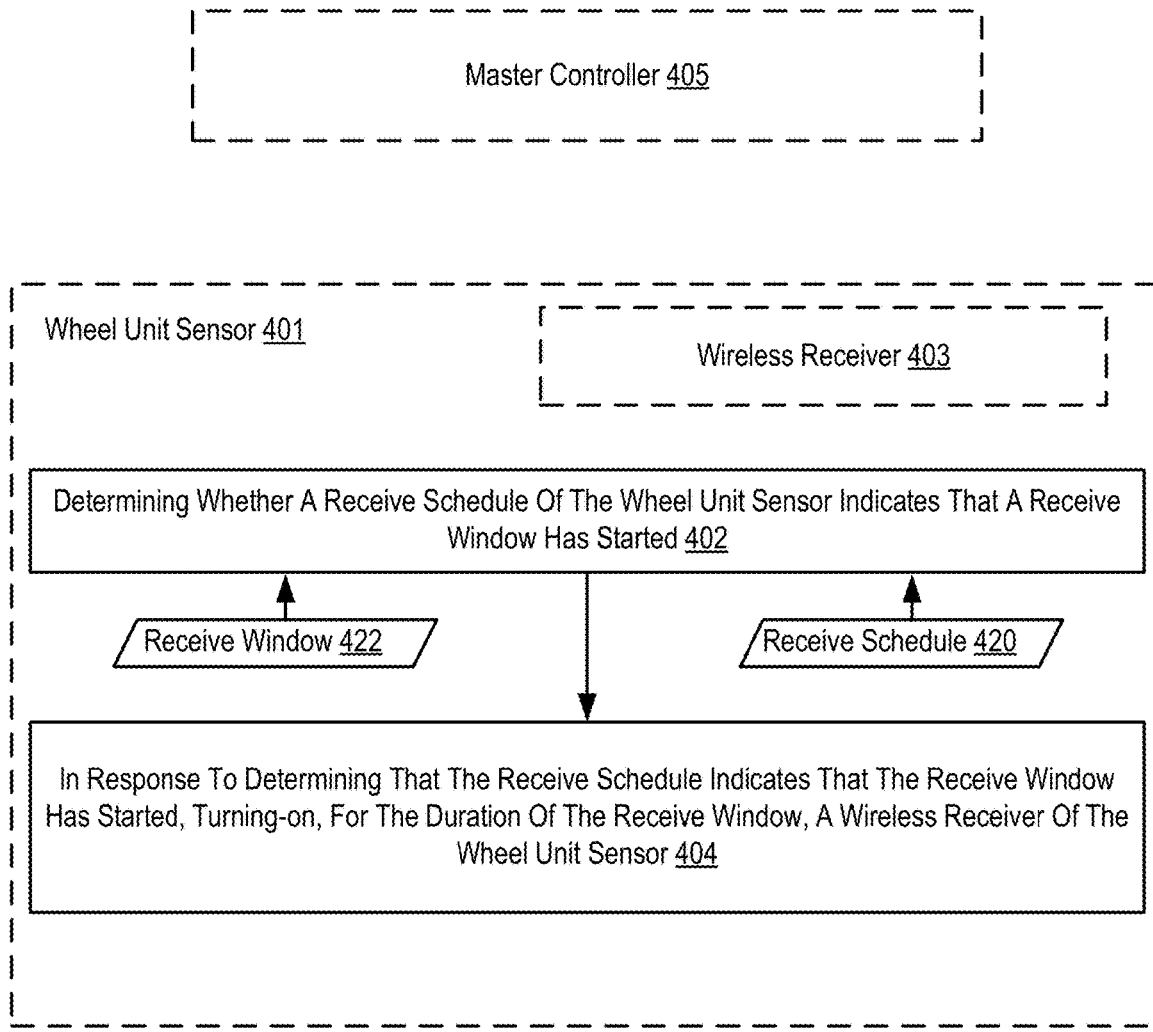
FIG. 4 is a flow chart of a method for improving communication between a wheel unit sensor and a master controller, according to at least one embodiment of the present disclosure.

FIG. 4 is a flow chart of a method for improving communication between a wheel unit sensor and a master controller, according to at least one embodiment of the present disclosure. The method of FIG. 4 includes determining (402), by the wheel unit sensor (401), whether a receive schedule (420) of the wheel unit sensor (401) indicates that a receive window (422) has started. Determining (402), by the wheel unit sensor (401), whether a receive schedule (420) of the wheel unit sensor (401) indicates that a receive window (422) has started may be carried out by tracking the number of clock cycles, periods of time, or any other metric for determining when to turn-on the wireless receiver.

A receive schedule may be a timing sequence that is used to determine when the wheel unit sensor performs certain actions, such as turn on or off a wireless receiver of the wheel unit sensor. A receive window may be scheduled to appear at specific periods within the receive schedule. For example, a receive window may occur within the receive schedule every ten seconds.

The receive schedule may be associated with a clock cycle of the wheel unit sensor. For example, the receive schedule may indicate that the receive window occurs after a set number of clock cycles. The length of the receive window may also be associated with the clock cycle. For example, the receive window may be a set number of clock cycles. In a particular embodiment, the length of the receive window may be dependent upon the size of the packet that is expected to be received from the master controller. In a particular embodiment, the amount of time that the wireless receiver is turned-on may be minimized by selected the smallest receive window that is possible for receiving a message from the master controller.

The method of FIG. 4 also includes in response to determining that the receive schedule (420) indicates that the receive window (422) has started, turning-on (404), by the wheel unit sensor (401), for the duration of the receive window (422), a wireless receiver (403) of the wheel unit sensor (401). In the example of FIG. 4, the wireless receiver (403) is configured to receive messages from the master controller (405). Turning-on (404), by the wheel unit sensor (401), for the duration of the receive window (422), a wireless receiver (403) of the wheel unit sensor (401) may be carried out by enabling the wireless receiver to receive messages.

Figure 5:
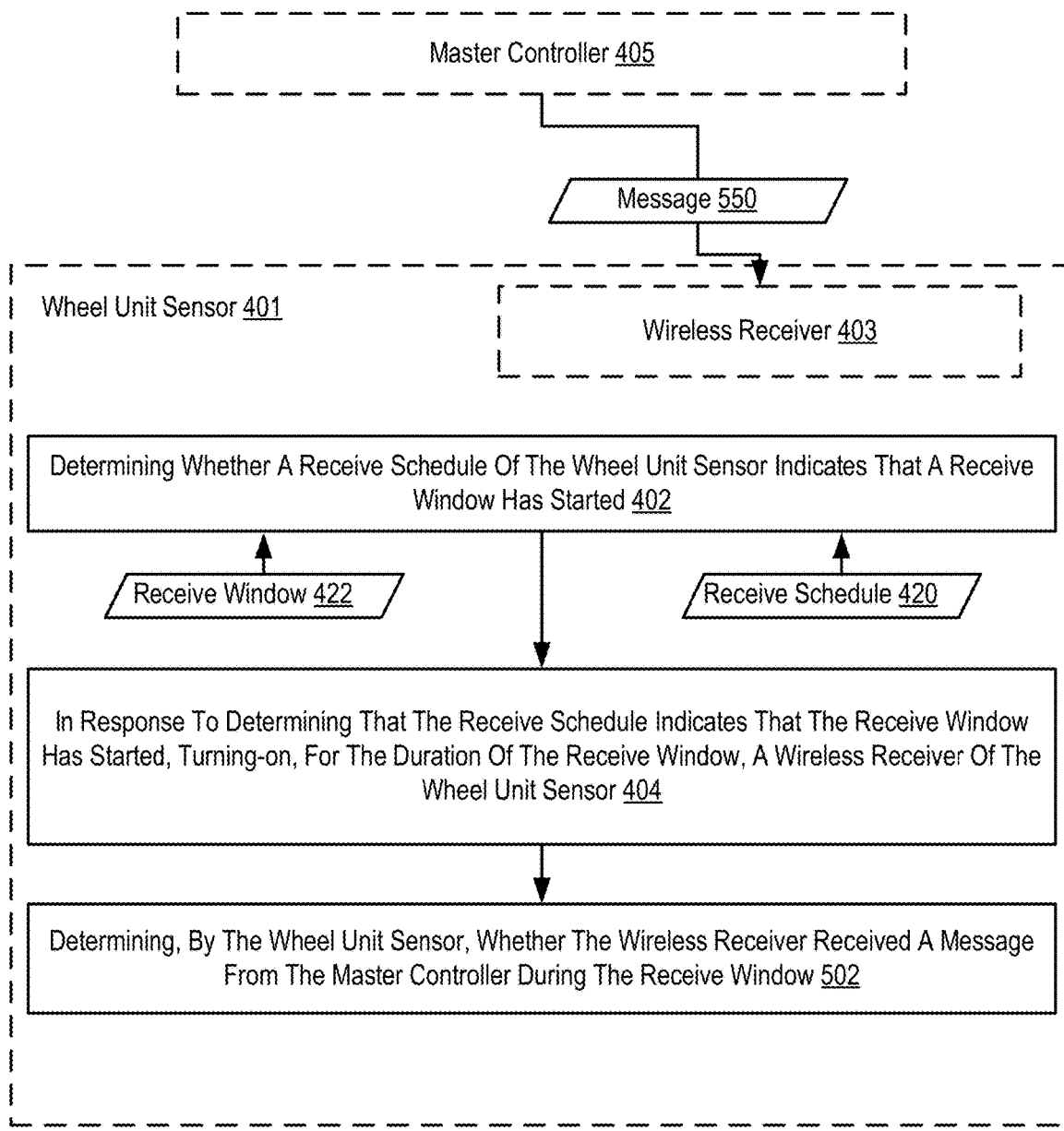
FIG. 5 is a flow chart of a method for improving communication between a wheel unit sensor and a master controller, according to at least one embodiment of the present disclosure.

FIG. 5 is a flow chart of a method for improving communication between a wheel unit sensor and a master controller, according to at least one embodiment of the present disclosure. The method of FIG. 5 is similar to the method of FIG. 4 in that the method of FIG. 5 also includes determining (402), by the wheel unit sensor (401), whether a receive schedule (420) of the wheel unit sensor (401) indicates that a receive window (422) has started; and in response to determining that the receive schedule (420) indicates that the receive window (422) has started, turning-on (404), by the wheel unit sensor (401), for the duration of the receive window (422), a wireless receiver (403) of the wheel unit sensor (401).

In addition, the method of FIG. 5 also includes determining (502), by the wheel unit sensor (401), whether the wireless receiver (403) received a message (550) from the master controller (405) during the receive window (422). Determining (502), by the wheel unit sensor (401), whether the wireless receiver (403) received a message (550) from the master controller (405) during the receive window (422) may be carried out by examining one or more stored values, parameters, counter, queues, or the like.

Figure 6:
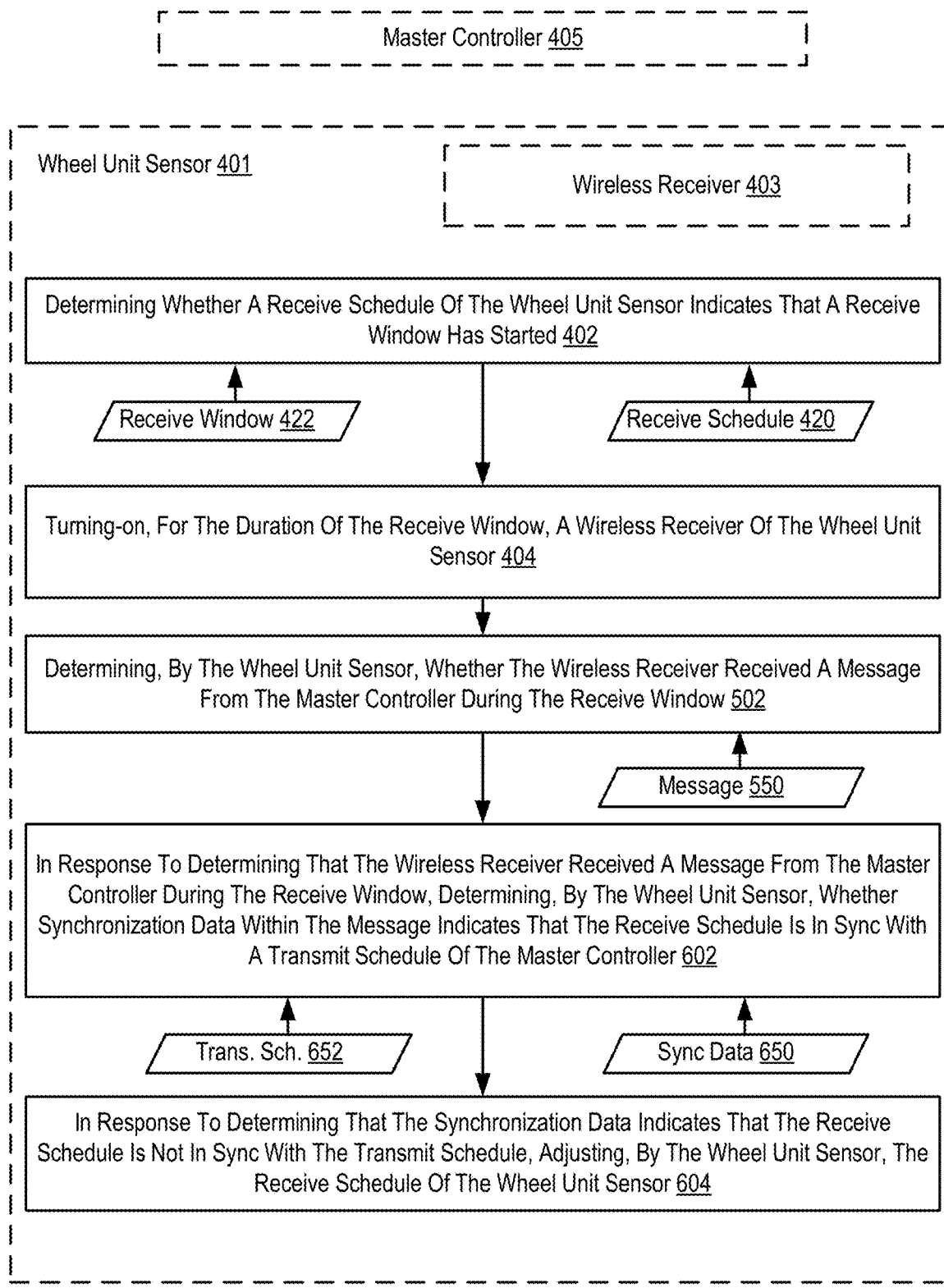
FIG. 6 is a flow chart of a method for improving communication between a wheel unit sensor and a master controller, according to at least one embodiment of the present disclosure.

FIG. 6 is a flow chart of a method for improving communication between a wheel unit sensor and a master controller, according to at least one embodiment of the present disclosure. The method of FIG. 6 is similar to the methods of FIG. 5 in that the method of FIG. 6 also includes determining (402), by the wheel unit sensor (401), whether a receive schedule (420) of the wheel unit sensor (401) indicates that a receive window (422) has started; includes in response to determining that the receive schedule (420) indicates that the receive window (422) has started, turning-on (404), by the wheel unit sensor (401), for the duration of the receive window (422), a wireless receiver (403) of the wheel unit sensor (401); and determining (502), by the wheel unit sensor (401), whether the wireless receiver (403) received a message (550) from the master controller (405) during the receive window (422).

The method of FIG. 6 also includes in response to determining that the wireless receiver (403) received a message (550) from the master controller (405) during the receive window (422), determining (602), by the wheel unit sensor (401), whether synchronization data (650) within the message (550) indicates that the receive schedule (420) is in sync with a transmit schedule (652) of the master controller (405). Synchronization data may be any data that indicates a positioning of the message within a transmit window of the master controller. For example, the synchronization data may indicate the number of messages that have been transmitted, the number of clock cycles, or the amount of time that has passed since the transmit window started, or any other information, or combination thereof. Determining (602), by the wheel unit sensor (401), whether synchronization data (650) within the message (550) indicates that the receive schedule (420) is in sync with a transmit schedule (652) of the master controller (405) may be carried out by comparing the synchronization data with the wheel unit sensor's receive schedule data. For example, the wheel unit sensor may compare the number of clock cycles that have passed in its receive window to the number of clock cycles that have passed in the transmit window.

In addition, the method of FIG. 6 also includes in response to determining that the synchronization data (650) indicates that the receive schedule (420) is not in sync with the transmit schedule (652), adjusting (604), by the wheel unit sensor (401), the receive schedule (420) of the wheel unit sensor (401). Adjusting (604), by the wheel unit sensor (401), the receive schedule (420) of the wheel unit sensor (401) may be carried out by causing the next receive window to start sooner or later; restarting values or counters that are associated with tracking the positioning of the receive window relative to the receive schedule, transmit window, or transmit schedule.

Figure 7:
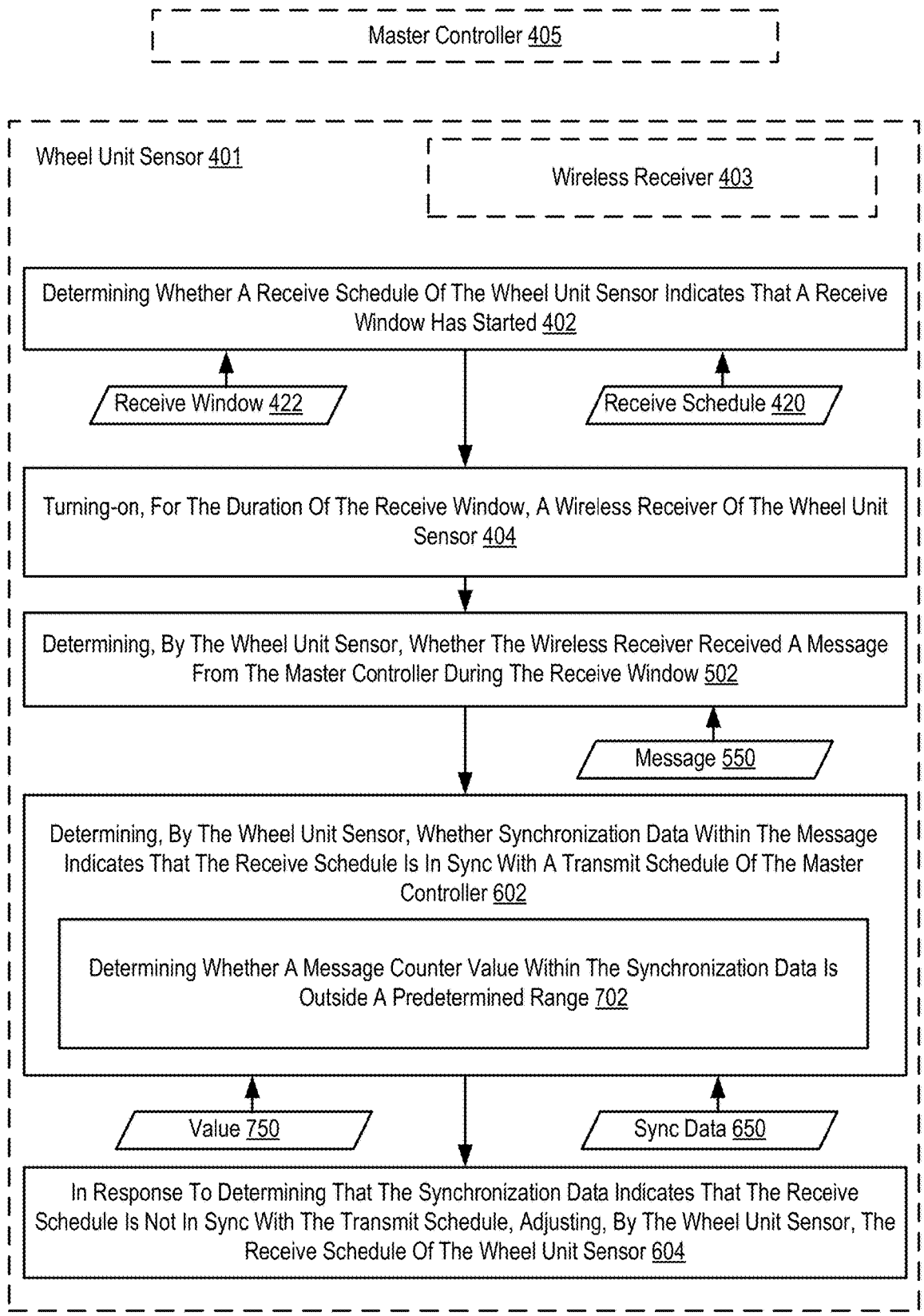
FIG. 7 is a flow chart of a method for improving communication between a wheel unit sensor and a master controller, according to at least one embodiment of the present disclosure.

FIG. 7 is a flow chart of a method for improving communication between a wheel unit sensor and a master controller, according to at least one embodiment of the present disclosure. The method of FIG. 7 is similar to the methods of FIGS. 4-6 in that the method of FIG. 7 also includes determining (402), by the wheel unit sensor (401), whether a receive schedule (420) of the wheel unit sensor (401) indicates that a receive window (422) has started; includes in response to determining that the receive schedule (420) indicates that the receive window (422) has started, turning-on (404), by the wheel unit sensor (401), for the duration of the receive window (422), a wireless receiver (403) of the wheel unit sensor (401); determining (502), by the wheel unit sensor (401), whether the wireless receiver (403) received a message (550) from the master controller (405) during the receive window (422); in response to determining that the wireless receiver (403) received a message (550) from the master controller (405) during the receive window (422), determining (602), by the wheel unit sensor (401), whether synchronization data (650) within the message (550) indicates that the receive schedule (420) is in sync with a transmit schedule (652) of the master controller (405); and in response to determining that the synchronization data (650) indicates that the receive schedule (420) is not in sync with the transmit schedule (652), adjusting (604), by the wheel unit sensor (401), the receive schedule (420) of the wheel unit sensor (401).

In the method of FIG. 7, determining (602), by the wheel unit sensor (401), whether synchronization data (650) within the message (550) indicates that the receive schedule (420) is in sync with a transmit schedule (652) of the master controller (405) includes determining (702) whether a message counter value (750) within the synchronization data (650) is outside a predetermined range. In the example of FIG. 7, the message counter value (750) indicates when within the transmit schedule (652) that the master controller (405) transmitted the message (550). A predetermined range may indicate an ideal number for messages to be transmitted to the wheel unit sensor before the receive window starts. Determining (702) whether a message counter value (750) within the synchronization data (650) is outside a predetermined range may be carried out by comparing the message counter value to the range. For example, the message counter may indicate that the master controller has transmitted 50 messages in a particular period. In this example, the predetermined range may be 36-38 messages. Continuing with this example, the wheel unit sensor may determine that the wheel unit sensor's schedule has gone faster relative to the transmit schedule of the master controller. In response, the wheel unit sensor may schedule the next transmit window to occur later in the receive schedule.

Figure 8A:
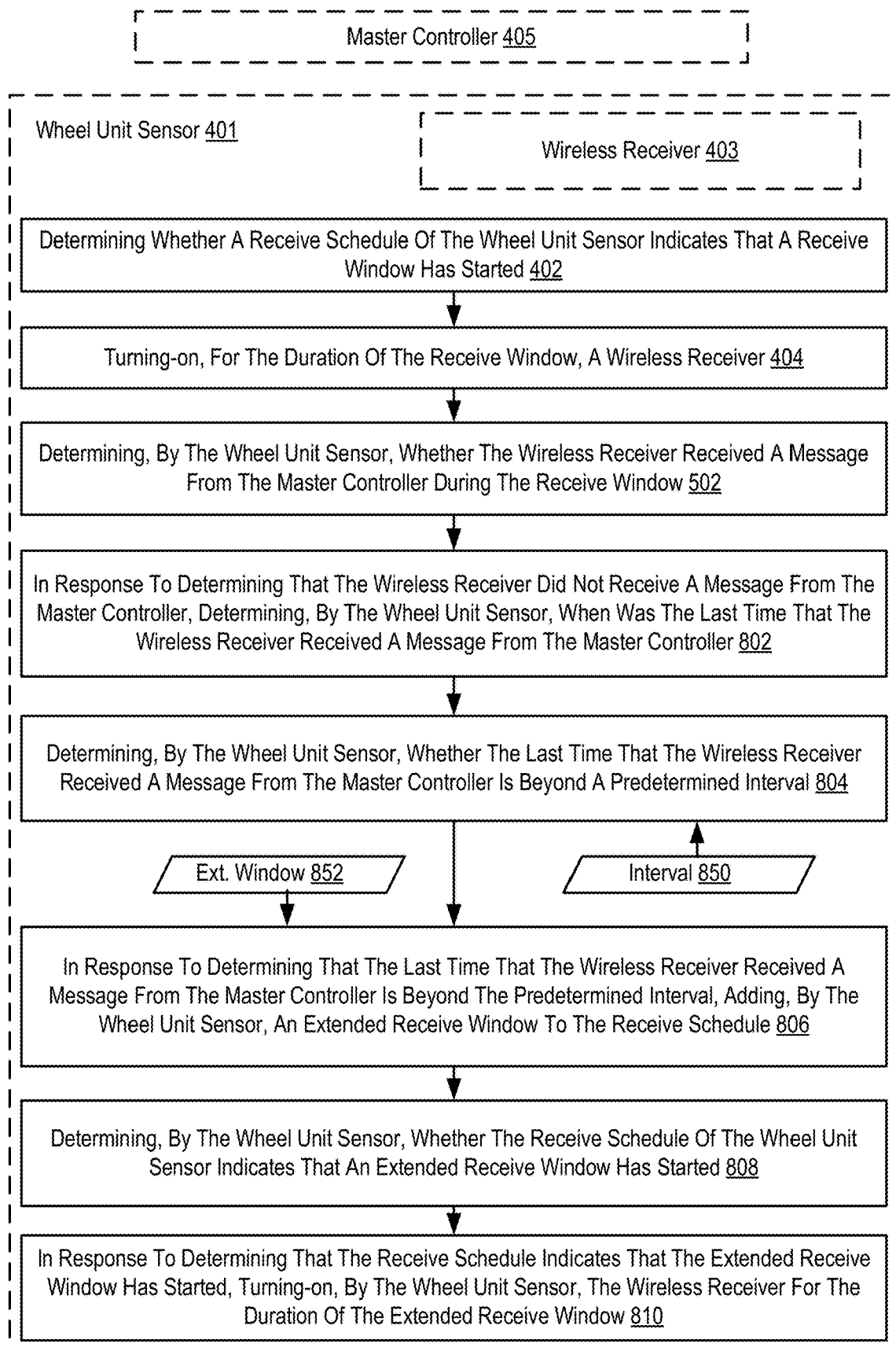
FIG. 8A is a flow chart of a method for improving communication between a wheel unit sensor and a master controller, according to at least one embodiment of the present disclosure.

FIG. 8A is a flow chart of a method for improving communication between a wheel unit sensor and a master controller, according to at least one embodiment of the present disclosure. The method of FIG. 8A is similar to the methods of FIGS. 4 and 5 in that the method of FIG. 8 also includes determining (402), by the wheel unit sensor (401), whether a receive schedule (420) of the wheel unit sensor (401) indicates that a receive window (422) has started; includes in response to determining that the receive schedule (420) indicates that the receive window (422) has started, turning-on (404), by the wheel unit sensor (401), for the duration of the receive window (422), a wireless receiver (403) of the wheel unit sensor (401); and determining (502), by the wheel unit sensor (401), whether the wireless receiver (403) received a message (550) from the master controller (405) during the receive window (422).

In addition, the method of FIG. 8A also includes in response to determining that the wireless receiver (403) did not receive a message (550) from the master controller (405), determining (802), by the wheel unit sensor (401), when was the last time that the wireless receiver (403) received a message (550) from the master controller (405). Determining (802), by the wheel unit sensor (401), when was the last time that the wireless receiver (403) received a message (550) from the master controller (405) may be carried out by counting the number of intervals that have passed without receiving a message from the master controller; or counting the number of clock cycles that have passed without receiving a message from the master controller.

The method of FIG. 8A also includes determining (804), by the wheel unit sensor (401), whether the last time that the wireless receiver (403) received a message (550) from the master controller (405) is beyond a predetermined interval (850). Determining (804), by the wheel unit sensor (401), whether the last time that the wireless receiver (403) received a message (550) from the master controller (405) is beyond a predetermined interval (850) may be carried out by comparing data that is associated with a tracking of the last time that the wireless receiver received a message to the predetermined interval. For example, the interval may be associated with 30 missed intervals. In this example, after 30 missed intervals, the wheel unit sensor may determine that the receive window is out of sync with the transmit window to such an extent that the wireless receiver will not receive a message from the master controller.

In the example of FIG. 8A, the method includes in response to determining that the last time that the wireless receiver (403) received a message (550) from the master controller (405) is beyond the predetermined interval (850), adding (806), by the wheel unit sensor (401), an extended receive window (852) to the receive schedule (420). Adding (806), by the wheel unit sensor (401), an extended receive window (852) to the receive schedule (420) may be carried out by creating a new window for the wireless receiver to turn-on.

In addition, the method of FIG. 8A also includes determining (808), by the wheel unit sensor (401), whether the receive schedule (420) of the wheel unit sensor (401) indicates that an extended receive window (852) has started. Determining (808), by the wheel unit sensor (401), whether the receive schedule (420) of the wheel unit sensor (401) indicates that an extended receive window (852) has started may be carried out by comparing clock cycle count to a determined clock cycle that the extended window is scheduled to start.

Furthermore, the method of FIG. 8A also includes in response to determining that the receive schedule (420) indicates that the extended receive window (852) has started, turning-on (810), by the wheel unit sensor (401), the wireless receiver (403) for the duration of the extended receive window (852). Turning-on (810), by the wheel unit sensor (401), the wireless receiver (403) for the duration of the extended receive window (850) may be carried out by powering on the wireless receiver so that the wireless receiver can receive messages from the master controller. In the example of FIG. 8A, the wheel unit sensor may use the extended receive window to receive messages on the assumption that the previous receive window was so out of sync with the transmit window that the TPM wireless receiver was not turned-on when the master controller was transmitting messages. That is, the method of FIG. 8A acts as a fail-safe routine to resync the receive schedule of the wheel unit sensor and the transmit schedule of the master controller.

Figure 8B:
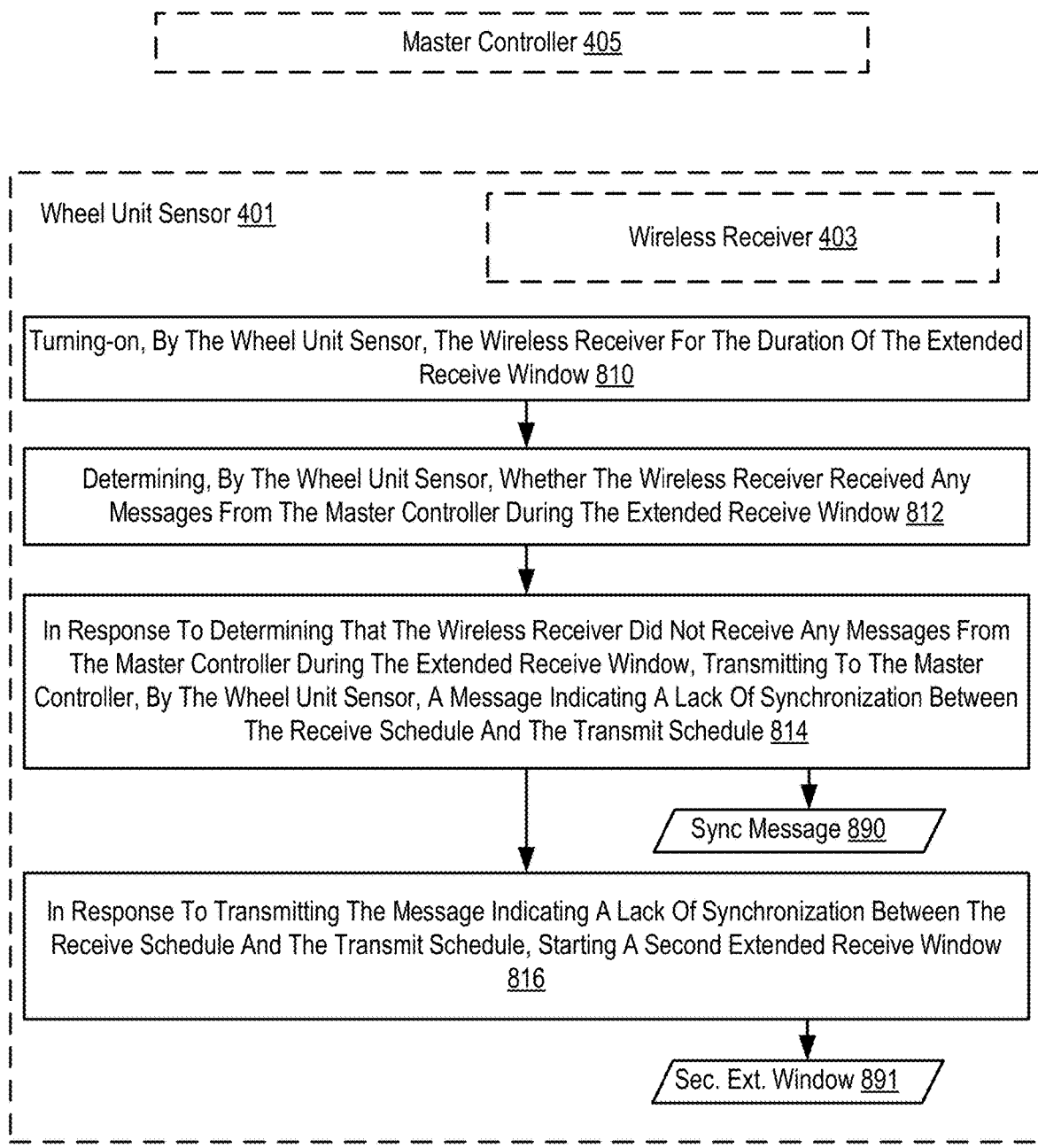
FIG. 8B is a flow chart of a method for improving communication between a wheel unit sensor and a master controller, according to at least one embodiment of the present disclosure.

FIG. 8B is a flow chart of a method for improving communication between a wheel unit sensor and a master controller, according to at least one embodiment of the present disclosure. Although not illustrated, the method of FIG. 8B includes all of the method of FIG. 8A including determining (402), by the wheel unit sensor (401), whether a receive schedule (420) of the wheel unit sensor (401) indicates that a receive window (422) has started; includes in response to determining that the receive schedule (420) indicates that the receive window (422) has started, turning-on (404), by the wheel unit sensor (401), for the duration of the receive window (422), a wireless receiver (403) of the wheel unit sensor (401); determining (502), by the wheel unit sensor (401), whether the wireless receiver (403) received a message (550) from the master controller (405) during the receive window (422); in response to determining that the wireless receiver (403) did not receive a message (550) from the master controller (405), determining (802), by the wheel unit sensor (401), when was the last time that the wireless receiver (403) received a message (550) from the master controller (405); determining (804), by the wheel unit sensor (401), whether the last time that the wireless receiver (403) received a message (550) from the master controller (405) is beyond a predetermined interval (850); in response to determining that the last time that the wireless receiver (403) received a message (550) from the master controller (405) is beyond the predetermined interval (850), adding (806), by the wheel unit sensor (401), an extended receive window (852) to the receive schedule (420); determining (808), by the wheel unit sensor (401), whether the receive schedule (420) of the wheel unit sensor (401) indicates that an extended receive window (852) has started; and in response to determining that the receive schedule (420) indicates that the extended receive window (852) has started, turning-on (810), by the wheel unit sensor (401), the wireless receiver (403) for the duration of the extended receive window (852).

The method of FIG. 8B differs from FIG. 8A in that the method of FIG. 8B includes determining (812), by the wheel unit sensor (401), whether the wireless receiver (403) received any messages from the master controller (405) during the extended receive window. Determining (812), by the wheel unit sensor (401), whether the wireless receiver (403) received any messages from the master controller (405) during the extended receive window may be carried out by examining a message queue or counter.

The method of FIG. 8B also includes in response to determining that the wireless receiver did not receive any messages from the master controller during the extended receive window, transmitting (814) to the master controller (405), by the wheel unit sensor (401), a message (890) indicating a lack of synchronization between the receive schedule and the transmit schedule. Transmitting (814) to the master controller (405), by the wheel unit sensor (401), a message (890) indicating a lack of synchronization between the receive schedule and the transmit schedule may be carried out by turning on a transmitter of the wheel unit sensor to transmit the message (890). In a particular embodiment, the message (890) acts an indicator to the master controller to begin transmitting messages to the wheel unit sensor.

The method of FIG. 8B also includes in response to transmitting the message (890) indicating a lack of synchronization between the receive schedule and the transmit schedule, starting, by the wheel unit sensor (401), a second extended receive window (891). As will be explained in FIG. 16, the master controller may be configured to receive the message (890) and in response to receive the message, transmit one or more messages to the wheel unit sensor. Because the wheel unit sensor has started a second extended receive window at the same time that the master controller begins transmitting one or more messages, the wheel unit sensor may receive the one or more messages from the master controller and resynchronize the receive schedule of the wheel unit sensor with the transmit schedule of the master controller. The one or more messages from the master controller may include synchronization data. Synchronization data may be any data that indicates a positioning of the message within a transmit window of the master controller. For example, the synchronization data may indicate the number of messages that have been transmitted, the number of clock cycles, or the amount of time that has passed since the transmit window started, or any other information, or combination thereof.

Figure 9:
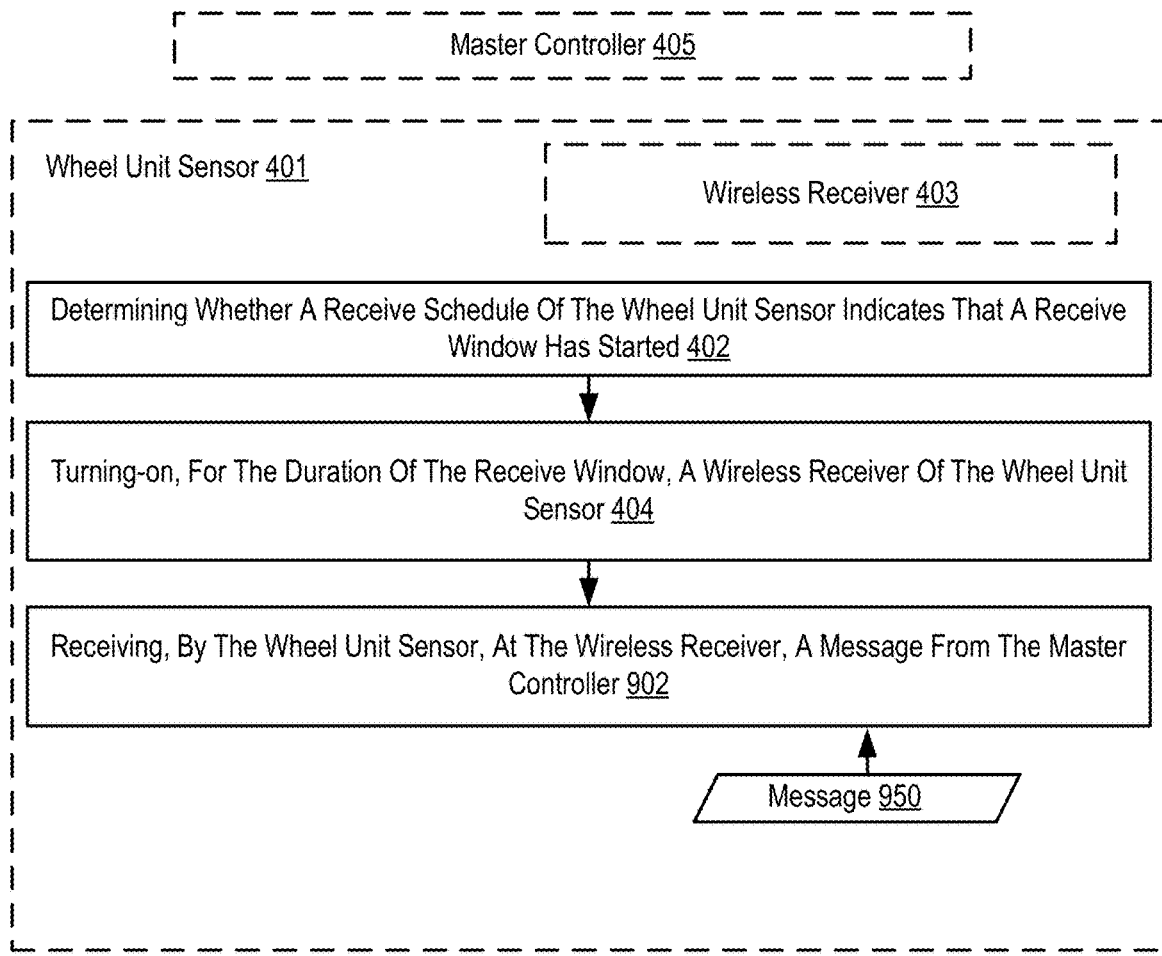
FIG. 9 is a flow chart of a method for improving communication between a wheel unit sensor and a master controller, according to at least one embodiment of the present disclosure.

FIG. 9 is a flow chart of a method for improving communication between a wheel unit sensor and a master controller, according to at least one embodiment of the present disclosure. The method of FIG. 9 is similar to the method of FIG. 4 in that the method of FIG. 9 also includes determining (402), by the wheel unit sensor (401), whether a receive schedule (420) of the wheel unit sensor (401) indicates that a receive window (422) has started; and in response to determining that the receive schedule (420) indicates that the receive window (422) has started, turning-on (404), by the wheel unit sensor (401), for the duration of the receive window (422), a wireless receiver (403) of the wheel unit sensor (401).

The method of FIG. 9 also includes receiving (902), by the wheel unit sensor (401), at the wireless receiver (403), a message (950) from the master controller (405). Receiving (902), by the wheel unit sensor (401), at the wireless receiver (403), a message (950) from the master controller (405) may be carried out by storing a message received at the wireless receiver. As explained above, because the wheel unit sensor is capable of receiving messages from the master controller, the master controller may be able to provide instructions or commands to the wheel unit sensor. For example, the master controller may transmit a message to the wheel unit sensor indicating that the car is moving, and therefore the master controller wants monitoring data from the wheel unit sensor. In this example, because the master controller is able to control the timing of the transmission of the monitoring data from the wheel unit sensor, the wheel unit sensor may not need motion detection hardware (e.g., an accelerometer) for determining that the vehicle is in operation, and therefore determining that the master controller wants monitoring data. In some embodiments, reducing or eliminating the need for motion detection hardware may reduce power and space consumption and increase the reliability of the wheel unit sensor over a system in which the wheel unit sensor is not capable of receiving messages from the master controller.

This type of two-way communication in a TPM system may also provide other advantages. For example, in a particular embodiment, the master controller may use a message to request monitoring data from the wheel unit sensor before the vehicle is in motion. This type of pre-motion data may be useful for providing the driver of the car with important information, such as whether a tire is flat, without having to move the vehicle. This type of pre-motion data may not be possible to receive from a wheel unit sensor that only relies on a motion detection device for wakeup.

Figure 10:
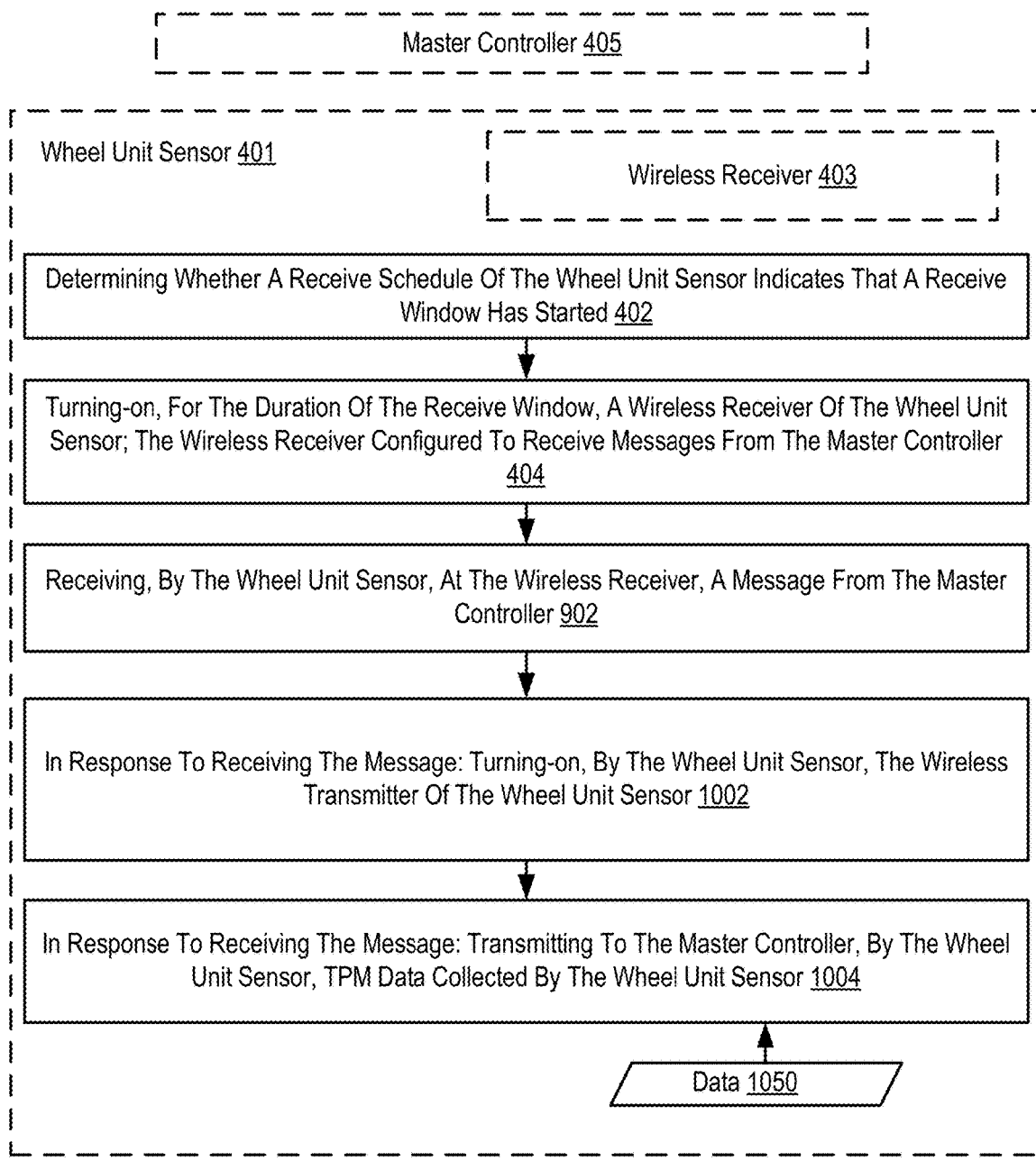
FIG. 10 is a flow chart of a method for improving communication between a wheel unit sensor and a master controller, according to at least one embodiment of the present disclosure.

FIG. 10 is a flow chart of a method for improving communication between a wheel unit sensor and a master controller, according to at least one embodiment of the present disclosure. The method of FIG. 10 is similar to the method of FIGS. 4 and 9 in that the method of FIG. 10 also includes determining (402), by the wheel unit sensor (401), whether a receive schedule (420) of the wheel unit sensor (401) indicates that a receive window (422) has started; in response to determining that the receive schedule (420) indicates that the receive window (422) has started, turning-on (404), by the wheel unit sensor (401), for the duration of the receive window (422), a wireless receiver (403) of the wheel unit sensor (401); and receiving (902), by the wheel unit sensor (401), at the wireless receiver (403), a message (950) from the master controller (405).

In the example of FIG. 10, the method includes in response to receiving the message (950), turning-on (1002), by the wheel unit sensor (401), the wireless transmitter (403) of the wheel unit sensor (401). Turning-on (1002), by the wheel unit sensor (401), the wireless transmitter (403) of the wheel unit sensor (401) may be carried out by providing power to the transmitter.

Furthermore, the method of FIG. 10 also includes transmitting (1004) to the master controller (405), by the wheel unit sensor (401), monitoring data (1050) collected by the wheel unit sensor (401). Transmitting (1004) to the master controller (405), by the wheel unit sensor (401), monitoring data (1050) collected by the wheel unit sensor (401) may be carried out by sending the monitoring data to the master controller.

Figure 11:
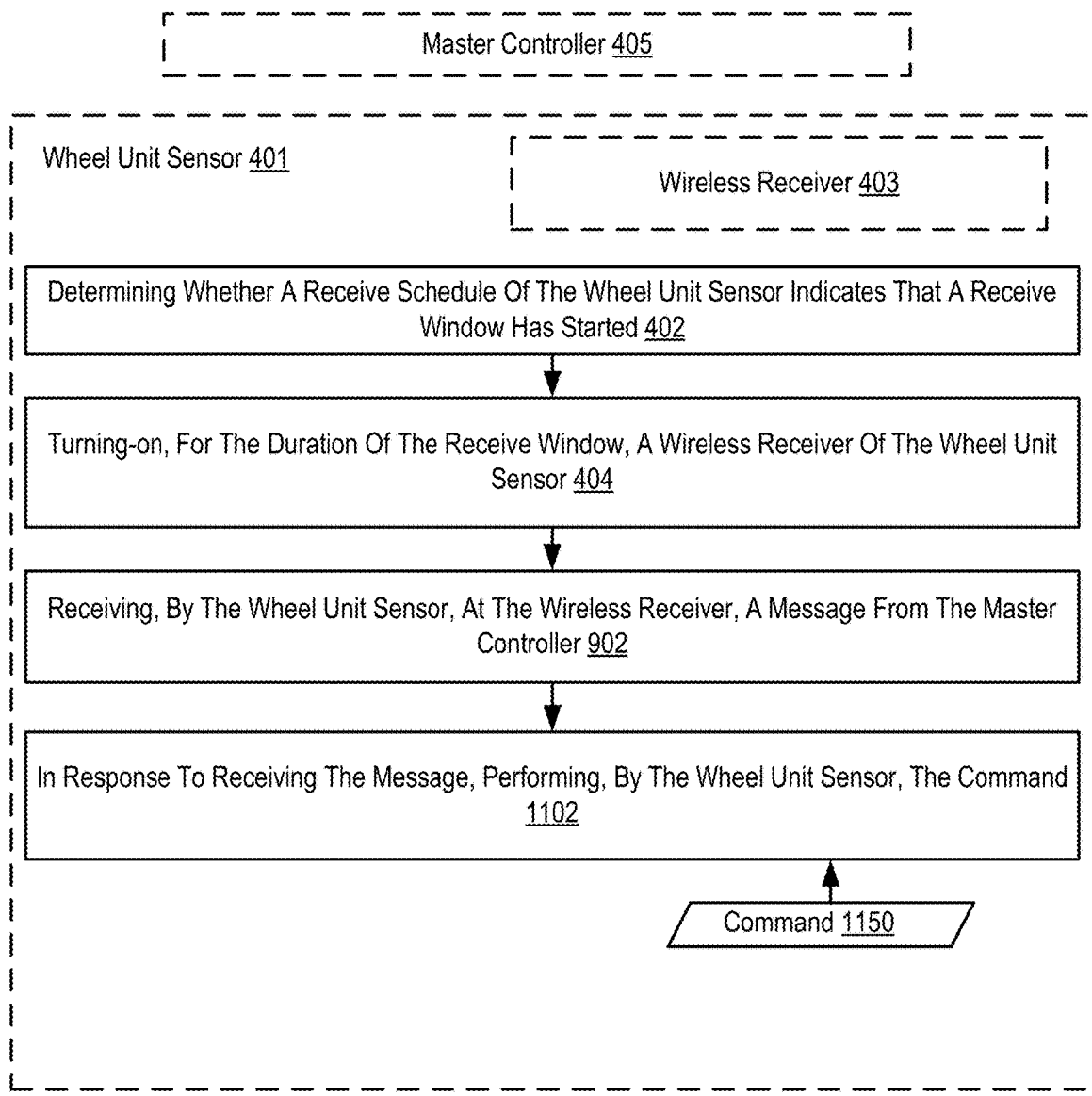
FIG. 11 is a flow chart of a method for improving communication between a wheel unit sensor and a master controller, according to at least one embodiment of the present disclosure.

FIG. 11 is a flow chart of a method for improving communication between a wheel unit sensor and a master controller, according to at least one embodiment of the present disclosure. The method of FIG. 11 is similar to the method of FIGS. 4 and 9 in that the method of FIG. 11 also includes determining (402), by the wheel unit sensor (401), whether a receive schedule (420) of the wheel unit sensor (401) indicates that a receive window (422) has started; in response to determining that the receive schedule (420) indicates that the receive window (422) has started, turning-on (404), by the wheel unit sensor (401), for the duration of the receive window (422), a wireless receiver (403) of the wheel unit sensor (401); and receiving (902), by the wheel unit sensor (401), at the wireless receiver (403), a message (950) from the master controller (405).

In the example of FIG. 11, the message (950) includes a command (1150) from the master controller (405). Examples of commands may include a wake-up instruction, an instruction to send specific monitoring data or a subset of monitoring data. In addition, the method of FIG. 11 also includes in response to receiving the message (950), performing (1102), by the wheel unit sensor (401), the command (1150). Performing (1102), by the wheel unit sensor (401), the command (1150) may be carried out by taking the action associated with the command.

Figure 12:
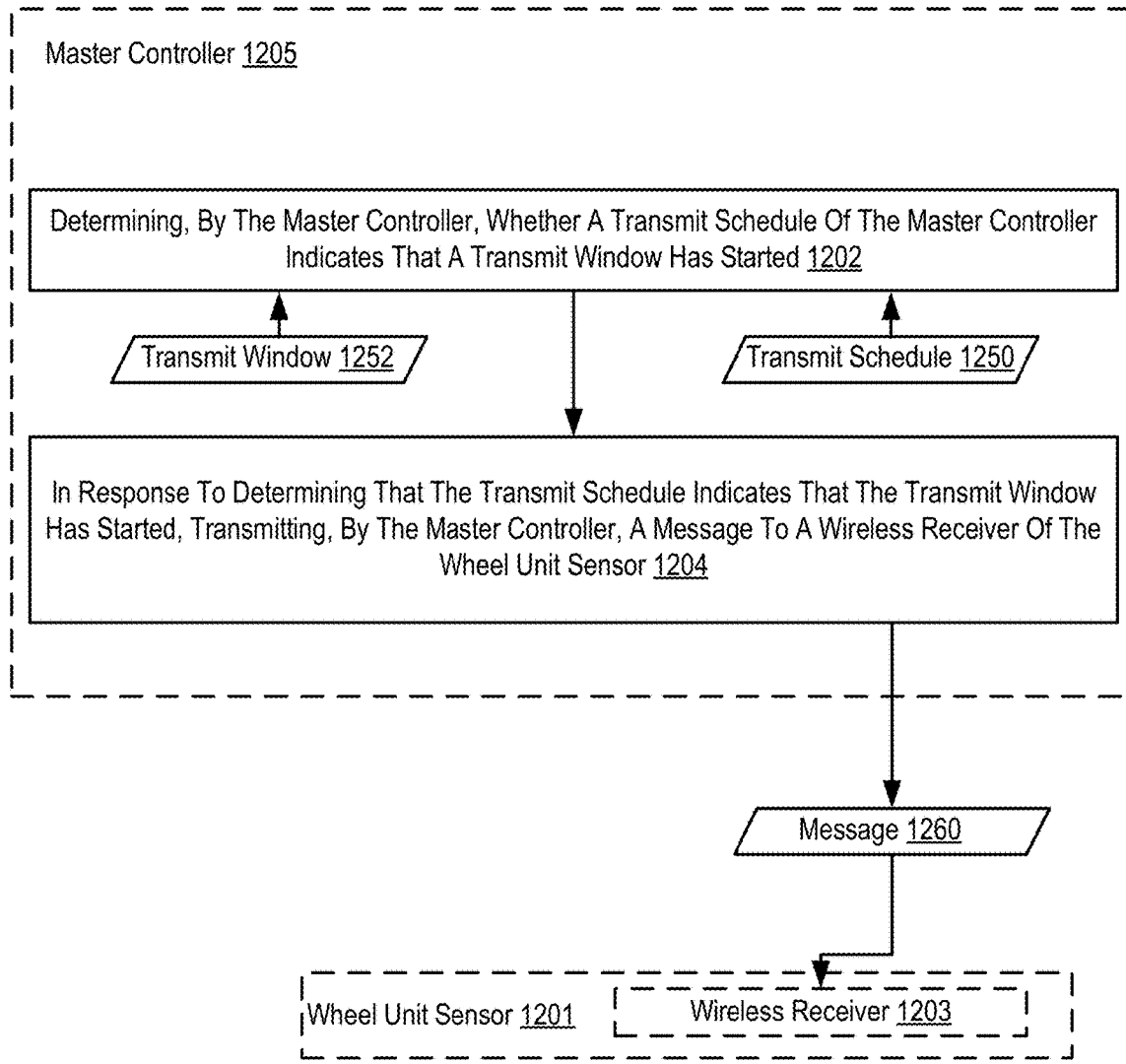
FIG. 12 is a flow chart of a method for improving communication between a wheel unit sensor and a master controller, according to at least one embodiment of the present disclosure.

FIG. 12 is a flow chart of a method for improving communication between a wheel unit sensor and a master controller, according to at least one embodiment of the present disclosure. The method of FIG. 12 includes determining (1202), by the master controller (1205), whether a transmit schedule (1250) of the master controller (1205) indicates that a transmit window (1250) has started. Determining (1202), by the master controller (1205), whether a transmit schedule (1250) of the master controller (1205) indicates that a transmit window (1252) has started may be carried out by comparing a clock cycle count to a clock cycle count to a predetermined number of clock cycles.

In addition, the method of FIG. 12 also includes in response to determining that the transmit schedule (1250) indicates that the transmit window (1252) has started, transmitting (1204), by the master controller (1205), a message (1260) to a wireless receiver (1203) of the wheel unit sensor (1201). Transmitting (1204), by the master controller (1205), a message (1260) to a wireless receiver (1230) of the wheel unit sensor (1201) may be carried out by turning-on a wireless transmitter and sending the message via the wireless transmitter.

Figure 13:
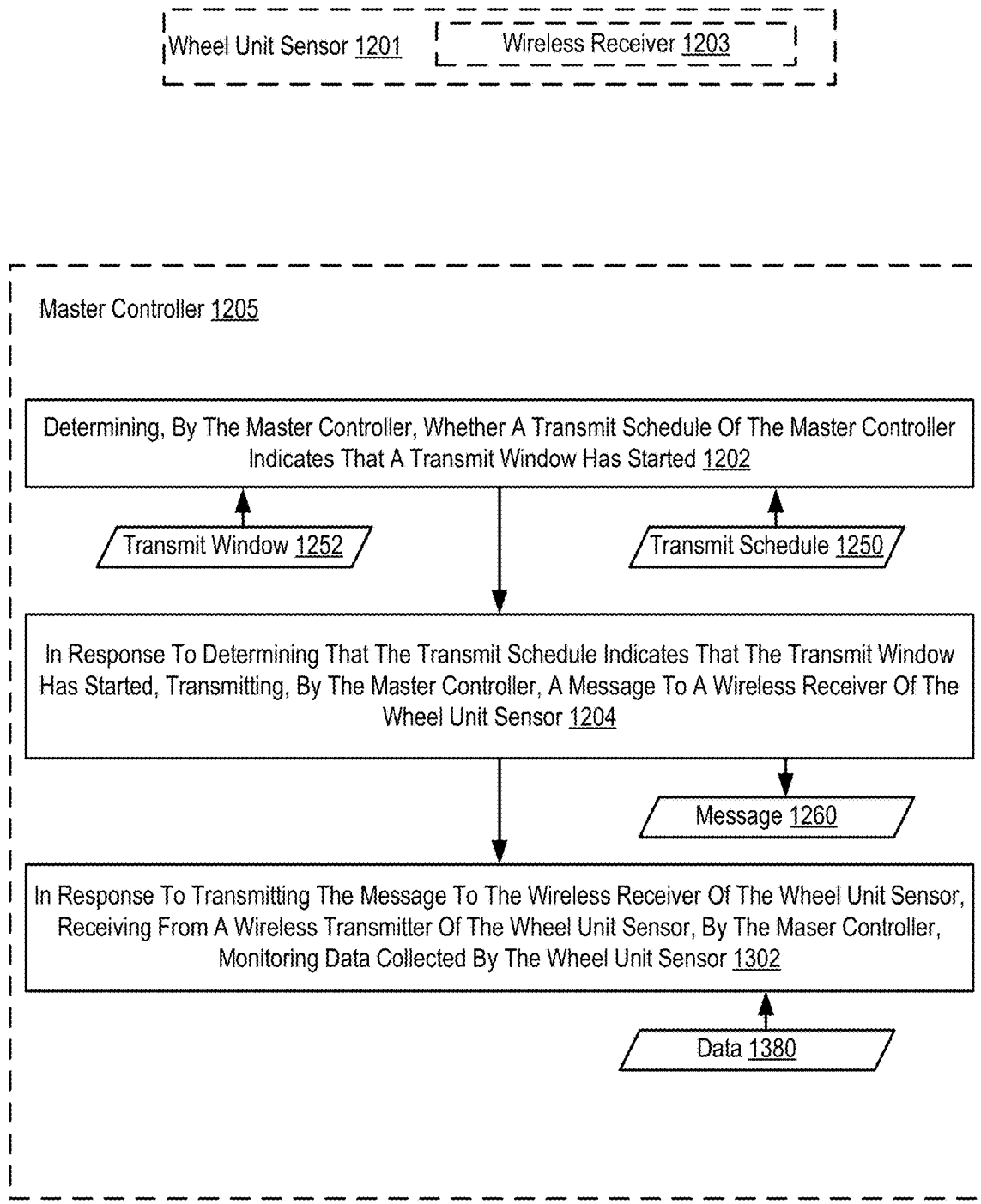
FIG. 13 is a flow chart of a method for improving communication between a wheel unit sensor and a master controller, according to at least one embodiment of the present disclosure.

FIG. 13 is a flow chart of a method for improving communication between a wheel unit sensor and a master controller, according to at least one embodiment of the present disclosure. The method of FIG. 13 is similar to the method of FIG. 12 in that the method of FIG. 13 also includes determining (1202), by the master controller (1205), whether a transmit schedule (1250) of the master controller (1205) indicates that a transmit window (1250) has started; and in response to determining that the transmit schedule (1250) indicates that the transmit window (1252) has started, transmitting (1204), by the master controller (1205), a message (1260) to a wireless receiver (1230) of the wheel unit sensor (1201).

In addition, the method of FIG. 13 also includes in response to transmitting the message (1260) to the wireless receiver (1230) of the wheel unit sensor (1201), receiving (1302) from a wireless transmitter (1332) of the wheel unit sensor (1201), by the master controller (1205), monitoring data (1380) collected by the wheel unit sensor (1201). Receiving (1302) from a wireless transmitter (1332) of the wheel unit sensor (1201), by the master controller (1205), monitoring data (1380) collected by the wheel unit sensor (1201) may be carried out by storing the monitoring data in a data storage device.

Figure 14:
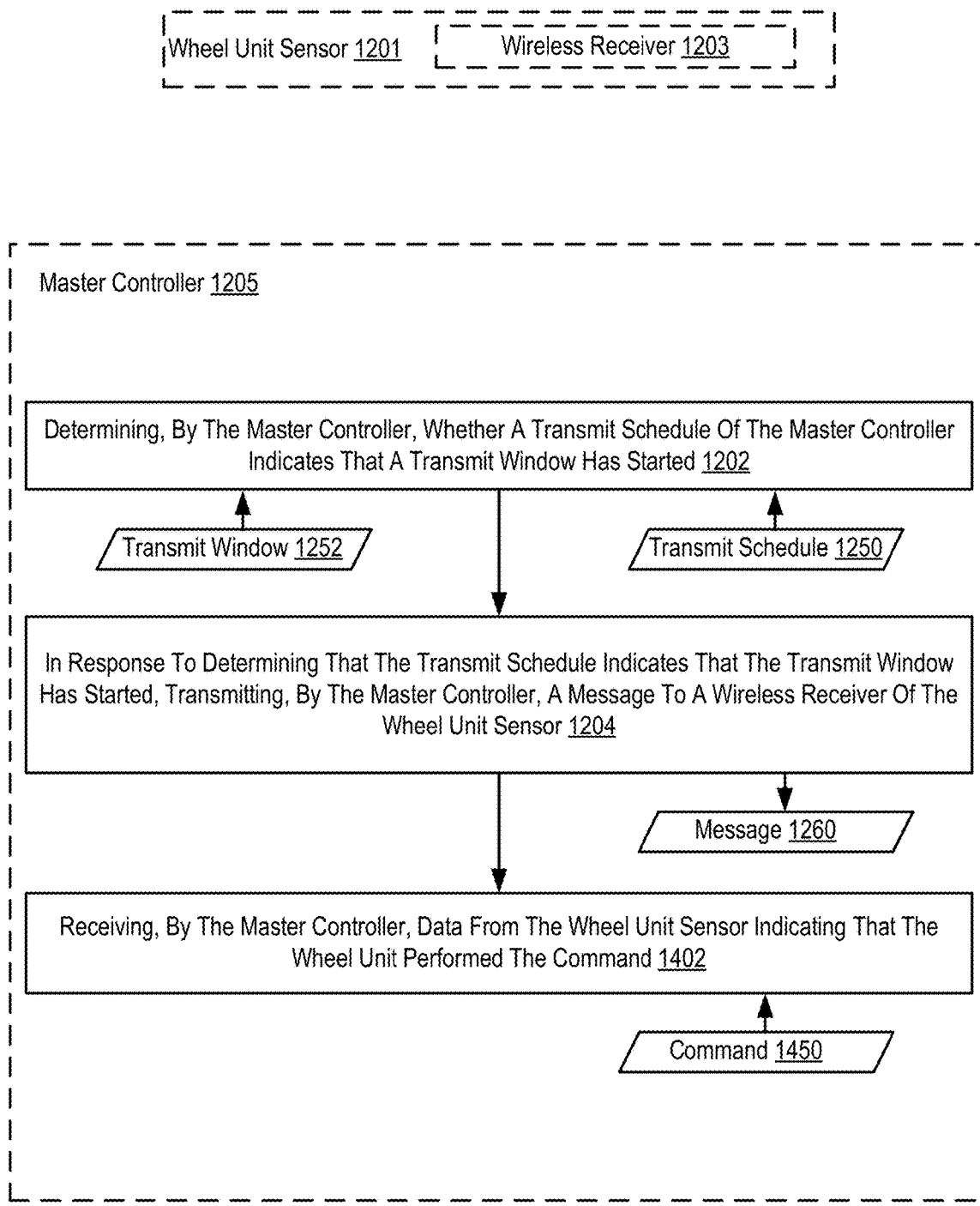
FIG. 14 is a flow chart of a method for improving communication between a wheel unit sensor and a master controller, according to at least one embodiment of the present disclosure.

FIG. 14 is a flow chart of a method for improving communication between a wheel unit sensor and a master controller, according to at least one embodiment of the present disclosure. The method of FIG. 14 is similar to the method of FIG. 12 in that the method of FIG. 14 also includes determining (1202), by the master controller (1205), whether a transmit schedule (1250) of the master controller (1205) indicates that a transmit window (1250) has started; and in response to determining that the transmit schedule (1250) indicates that the transmit window (1252) has started, transmitting (1204), by the master controller (1205), a message (1260) to a wireless receiver (1230) of the wheel unit sensor (1201).

In the method of FIG. 14, the message (1260) transmitted by the master controller (1205) includes a command (1450) for the wheel unit sensor (1201) to perform. In addition, the method of FIG. 14 also includes receiving (1402), by the master controller (1205), data (1450) from the wheel unit (1201) indicating that the wheel unit (1201) performed the command (1450). Receiving (1402), by the master controller (1205), data (1450) from the wheel unit (1201) indicating that the wheel unit (1201) performed the command (1450) may be carried out by receiving data associated with performance of the command. For example, if the master controller requested specific monitoring data in the command, the receipt of that data from the wheel unit sensor is an indication that the command was performed by the wheel unit sensor. As another example, if the master controller requested the wheel unit sensor to wake-up, receipt of any data from the wheel unit sensor may be confirmation that the command to wakeup was performed.

Figure 15:
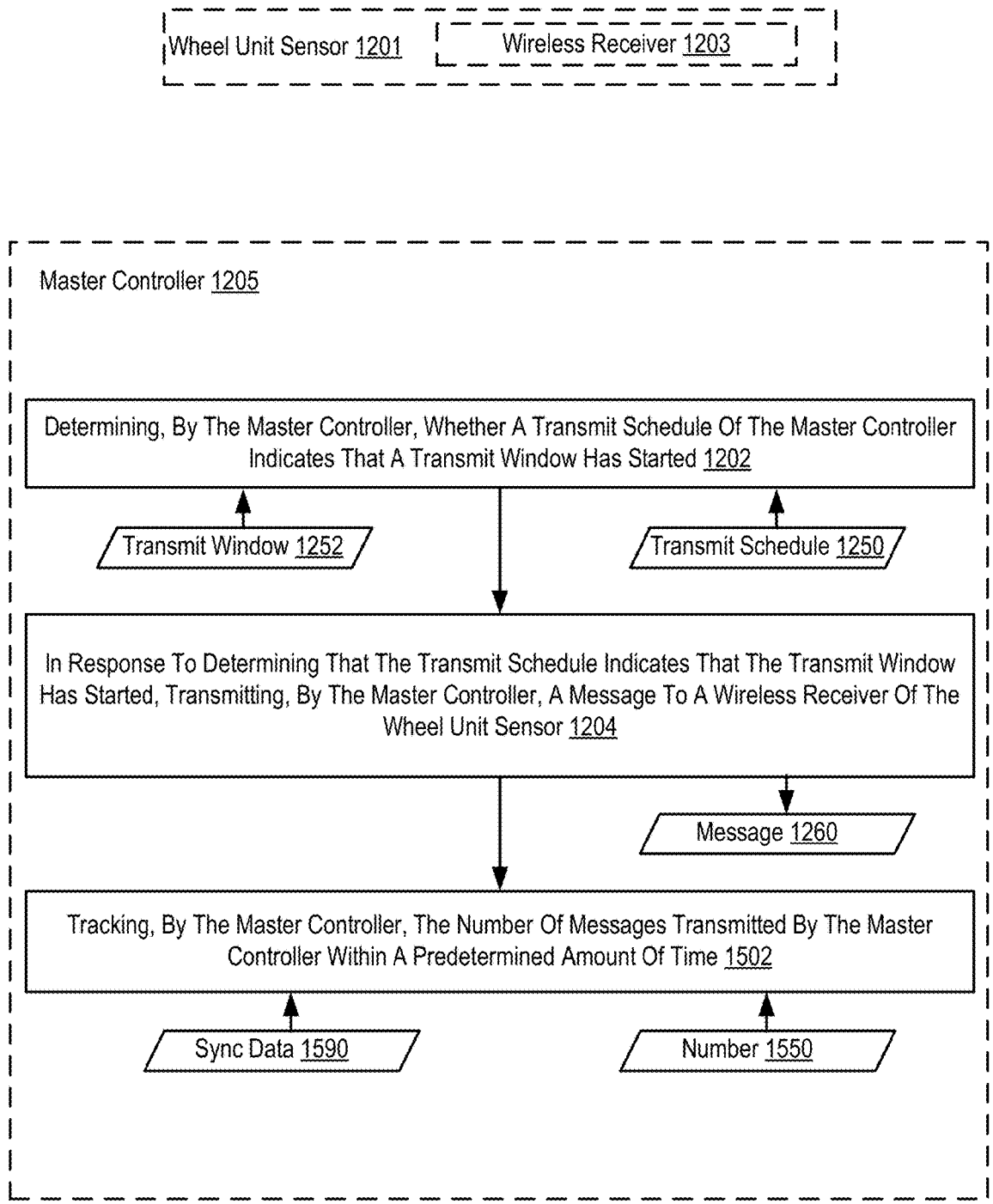
FIG. 15 is a flow chart of a method for improving communication between a wheel unit sensor and a master controller, according to at least one embodiment of the present disclosure.

FIG. 15 is a flow chart of a method for improving communication between a wheel unit sensor and a master controller, according to at least one embodiment of the present disclosure. The method of FIG. 15 is similar to the method of FIG. 12 in that the method of FIG. 15 also includes determining (1202), by the master controller (1205), whether a transmit schedule (1250) of the master controller (1205) indicates that a transmit window (1250) has started; and in response to determining that the transmit schedule (1250) indicates that the transmit window (1252) has started, transmitting (1204), by the master controller (1205), a message (1260) to a wireless receiver (1230) of the wheel unit sensor (1201).

In addition, the method of FIG. 15 includes tracking (1502), by the master controller (1205), the number (1550) of messages transmitted by the master controller (1205) within a predetermined amount of time. Tracking (1502), by the master controller (1205), the number (1550) of messages transmitted by the master controller (1205) within a predetermined amount of time may be carried out by using a counter. For example, the master controller may increment a counter every time that a message is transmitted within a predetermined interval.

In the example of FIG. 15, the message (1260) includes synchronization data (1590) indicating the number (1550) of messages transmitted by the master controller (1205) within the predetermined amount of time. For example, the master controller may transmit a message containing values of one or more counters (e.g., the burst counter, the message counters of FIG. 3).

Figure 16:
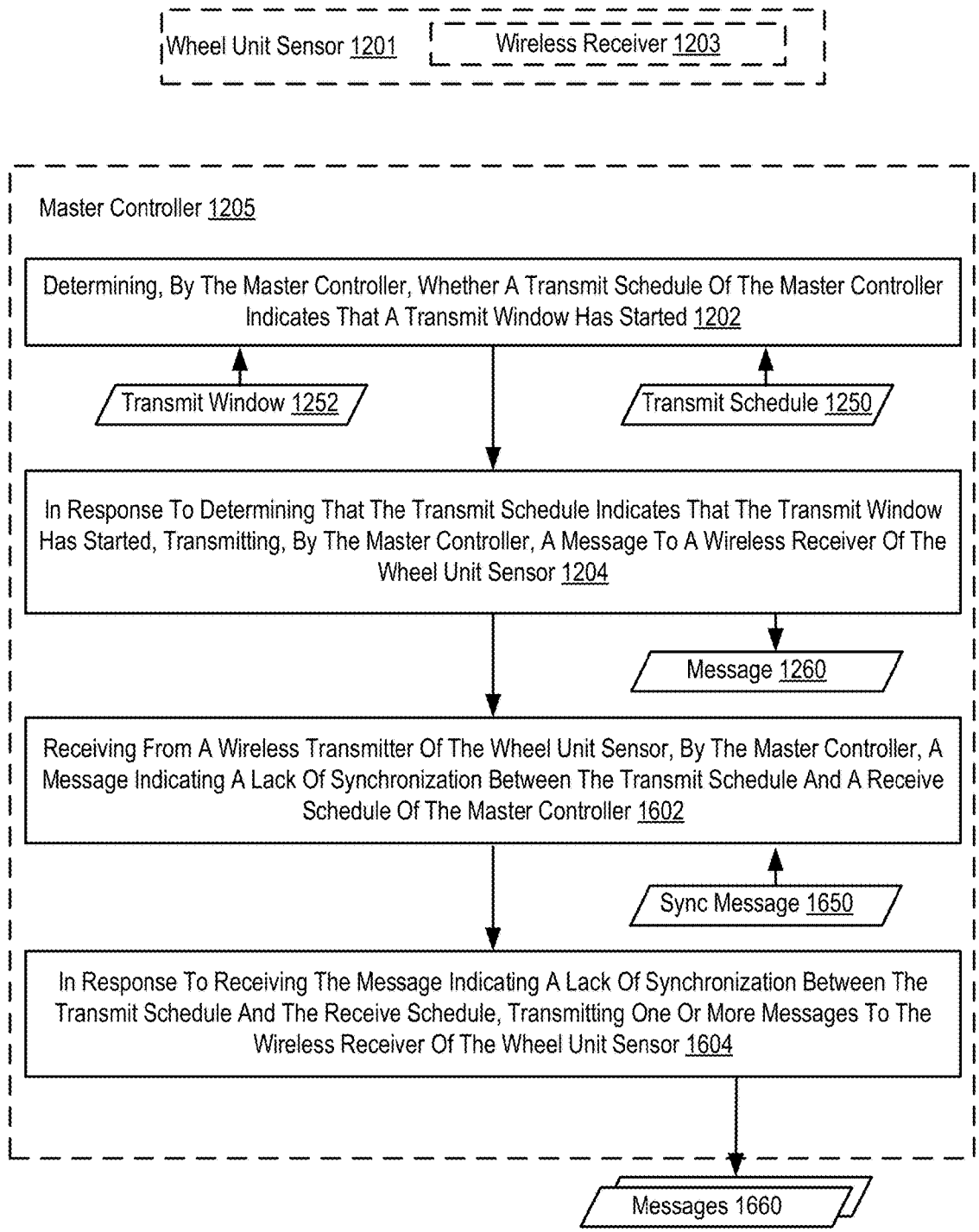
FIG. 16 is a block diagram of a TPM system for improving communication between a wheel unit sensor and a master controller, according to at least one embodiment of the present disclosure.

FIG. 16 is a flow chart of a method for improving communication between a wheel unit sensor and a master controller, according to at least one embodiment of the present disclosure. The method of FIG. 16 is similar to the method of FIG. 12 in that the method of FIG. 16 also includes determining (1202), by the master controller (1205), whether a transmit schedule (1250) of the master controller (1205) indicates that a transmit window (1250) has started; and in response to determining that the transmit schedule (1250) indicates that the transmit window (1252) has started, transmitting (1204), by the master controller (1205), a message (1260) to a wireless receiver (1230) of the wheel unit sensor (1201).

In addition, the method of FIG. 16 also includes receiving (1602) from a wireless transmitter (1203) of the wheel unit sensor (1201), by the master controller (1205), a message (1650) indicating a lack of synchronization between the transmit schedule and a receive schedule of the master controller. Receiving (1602) from a wireless transmitter (1203) of the wheel unit sensor (1201), by the master controller (1205), a message (1650) indicating a lack of synchronization between the transmit schedule and a receive schedule of the master controller may be carried out by receiving at a wireless receiver data from the wireless transmitter of the wheel unit sensor.

The method of FIG. 16 also includes in response to receiving the message (1650) indicating a lack of synchronization between the transmit schedule and the receive schedule, transmitting (1604) one or more messages (1660) to the wireless receiver (1203) of the wheel unit sensor (1201). Transmitting (1604) one or more messages (1660) to the wireless receiver (1203) of the wheel unit sensor (1201) may be carried out by transmitting messages that include synchronization data. Synchronization data may be any data that indicates a positioning of the message within a transmit window of the master controller. For example, the synchronization data may indicate the number of messages that have been transmitted, the number of clock cycles, or the amount of time that has passed since the transmit window started, or any other information, or combination thereof.

FIG. 17 is a block diagram of a monitoring system (1700) for improving communication between a wheel unit sensor (1701) and a master controller (1705), according to at least one embodiment of the present disclosure. In a particular embodiment, the monitoring system is a TPM system where the wheel unit sensor is a TPM device. The master controller (1705) of FIG. 17 includes a controller (1706) coupled to a memory (1751), a transmitter (1707), and a receiver (1708). The wheel unit sensor (1701) of FIG. 17 includes a controller (1776) coupled to a memory (1771), a transmitter (1777), and a receiver (1778). In a particular embodiment, the controllers (1706, 1776) include computer hardware for executing computer hardware instructions.

In the example of FIG. 17, the memory (1771) of the wheel unit sensor (1701) includes computer program instructions (1770) that when executed by the controller (1776) of the wheel unit sensor cause the controller (1776) of the wheel unit sensor (1701) to determine, by the wheel unit sensor (1701), whether a receive schedule of the wheel unit sensor (1701) indicates that a receive window has started; and in response to determining that the receive schedule indicates that the receive window has started, turn-on, by the wheel unit sensor (1701), for the duration of the receive window, a wireless receiver of the wheel unit sensor (1701).

In a particular embodiment, the wheel unit sensor (1701) and the master controller (1705) utilize Bluetooth Low Energy (also known as "Bluetooth LE" or "BLE") frequencies and technologies to transmit and receive data from each other with the transmitters (1707, 1777) and receivers (1708, 1778). Because Bluetooth frequencies are commonly used in other vehicular applications, there is a reduced need for a transceiver dedicated to TPMS usage. It should be understood that although certain embodiments are described in reference to BLE, embodiments are not so limited and can be used at any transmission frequency using any type of protocol. It also should be understood that while embodiments are described with respect to tire pressure sensors, embodiments can be used in any type of use case.

In the example of FIG. 17, the memory (1751) of the master controller (1705) includes computer program instructions (1650) that when executed by the controller (1706) of the master controller (1705) cause the controller (1706) of the master controller (1705) to determine, by the master controller (1705), whether a transmit schedule of the master controller (1705) indicates that a transmit window has started; and in response to determining that the transmit schedule indicates that the transmit window has started, transmit, by the master controller (1705), a message to a wireless receiver of the wheel unit sensor (1701).

In the example of FIG. 17, the wheel unit sensor (1701) is capable of not only transmitting monitoring data, but also receiving messages from the master controller (1705). Because the wheel unit sensor (1701) is capable of receiving messages from the master controller (1705), the master controller (1705) may be able to provide instructions or commands to the wheel unit sensor (1701). For example, the master controller (1705) may transmit a message to the wheel unit sensor (1701) indicating that the car is moving, and therefore the master controller (1705) wants monitoring data from the wheel unit sensor (1701). In this example, because the master controller (1705) is able to control the timing of the transmission of the monitoring data from the wheel unit sensor (1701), the wheel unit sensor (1701) may not need motion detection hardware (e.g., an accelerometer) for determining that the vehicle is in operation, and therefore determining that the master controller (1705) wants monitoring data. In some embodiments, reducing or eliminating the need for motion detection hardware may reduce power and space consumption and increase the reliability of the wheel unit sensor (1701) over a system in which the wheel unit sensor (1701) is not capable of receiving messages from the master controller (1705).

The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts.

It will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may be dependent from any or all claims in a multiple dependent manner even though such has not been originally claimed.

What is claimed is:

1. A method of improving communication between a wheel unit sensor and a master controller, the method comprising:
   determining, by the wheel unit sensor, whether a wireless receiver of the wheel unit sensor received a message from a master controller during a receive window of a receive schedule of the wheel unit sensor;
   in response to determining that the wireless receiver did not receive a message from the master controller during the receive window, determining, by the wheel unit sensor, whether a last time that the wireless receiver received a message from the master controller is beyond a predetermined interval;
   in response to determining that the last time that the wireless receiver received a message from the master controller is beyond the predetermined interval, adding, by the wheel unit sensor, an extended receive window to the receive schedule;
   determining, by the wheel unit sensor, whether the receive schedule of the wheel unit sensor indicates that an extended receive window has started; and
   in response to determining that the receive schedule indicates that the extended receive window has started, turning-on, by the wheel unit sensor, the wireless receiver for the duration of the extended receive window.

2. The method of claim 1 further comprising:
   in response to determining that the wireless receiver received a message from the master controller during the receive window, determining, by the wheel unit sensor, whether synchronization data within the message indicates that the receive schedule is in sync with a transmit schedule of the master controller; and
   in response to determining that the synchronization data indicates that the receive schedule is not in sync with the transmit schedule, adjusting, by the wheel unit sensor, the receive schedule of the wheel unit sensor.

3. The method of claim 1 further comprising:
   determining, by the wheel unit sensor, whether the wireless receiver received any messages from the master controller during the extended receive window;

in response to determining that the wireless receiver did not receive any messages from the master controller during the extended receive window, transmitting to the master controller, by the wheel unit sensor, a message indicating a lack of synchronization between the receive schedule and the transmit schedule; and in response to transmitting the message indicating a lack of synchronization between the receive schedule and the transmit schedule, starting a second extended receive window.

4. The method of claim 1 further comprising:
receiving, by the wheel unit sensor, at the wireless receiver, a message from the master controller.

5. The method of claim 4 further comprising:
in response to receiving the message:
  turning-on, by the wheel unit sensor, the wireless transmitter of the wheel unit sensor; and
  transmitting to the master controller, by the wheel unit sensor, monitoring data collected by the wheel unit sensor.

6. The method of claim 4 wherein the message includes a command from the master controller; and
the method further comprising in response to receiving the message, performing, by the wheel unit sensor, the command.

7. A wheel unit sensor configured for improving communication with a master controller, the wheel unit sensor comprising a wireless receiver and a controller coupled to memory, the memory including computer program instructions that when executed by the controller cause the controller to carry out the actions of:

determining whether the wireless receiver received a message from the master controller during a receive window of a receive schedule of the wheel unit sensor;

in response to determining that the wireless receiver did not receive a message from the master controller during the receive window, determining whether a last time that the wireless receiver received a message from the master controller is beyond a predetermined interval;

in response to determining that the last time that the wireless receiver received a message from the master controller is beyond the predetermined interval, adding an extended receive window to the receive schedule;

determining whether the receive schedule of the wheel unit sensor indicates that an extended receive window has started; and in response to determining that the receive schedule indicates that the extended receive window has started, turning-on, the wireless receiver for the duration of the extended receive window.

8. The apparatus of claim 4 further comprising computer program instructions that when executed by the controller cause the controller to carry out the actions of:

in response to determining that the wireless receiver received a message from the master controller during the receive window, determining whether synchronization data within the message indicates that the receive schedule is in sync with a transmit schedule of the master controller; and in response to determining that the synchronization data indicates that the receive schedule is not in sync with the transmit schedule, adjusting the receive schedule of the wheel unit sensor.

* * * * *